United States Patent
Morita et al.

(10) Patent No.: US 9,767,264 B2
(45) Date of Patent: Sep. 19, 2017

(54) APPARATUS, METHOD FOR CONTROLLING APPARATUS, AND PROGRAM

(71) Applicants: Naoya Morita, Kanagawa (JP); Hitoshi Namiki, Kanagawa (JP)

(72) Inventors: Naoya Morita, Kanagawa (JP); Hitoshi Namiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/695,312

(22) Filed: Apr. 24, 2015

(65) Prior Publication Data

US 2015/0339467 A1 Nov. 26, 2015

(30) Foreign Application Priority Data

May 23, 2014 (JP) ................. 2014-106775
Jul. 8, 2014 (JP) ................. 2014-140219
Feb. 13, 2015 (JP) ................. 2015-026698

(51) Int. Cl.
| | |
|---|---|
| *G06F 21/31* | (2013.01) |
| *G05B 15/02* | (2006.01) |
| *G06F 21/62* | (2013.01) |
| *G06Q 10/06* | (2012.01) |

(52) U.S. Cl.
CPC ............ *G06F 21/31* (2013.01); *G05B 15/02* (2013.01); *G06F 21/6218* (2013.01); *G06Q 10/06* (2013.01)

(58) Field of Classification Search
CPC .............................. G06F 21/32; G06F 21/6218
See application file for complete search history.

(56) References Cited

U.S. PATENT DOCUMENTS

| | | |
|---|---|---|
| 5,379,423 A | 1/1995 | Mutoh et al. |
| 6,317,638 B1 | 11/2001 | Schreder et al. |
| 7,031,946 B1 | 4/2006 | Tamai et al. |

(Continued)

FOREIGN PATENT DOCUMENTS

| | | |
|---|---|---|
| EP | 1 564 666 A1 | 8/2005 |
| JP | H02-090342 | 3/1990 |

(Continued)

OTHER PUBLICATIONS

Extended European Search Report issued Aug. 10, 2015 in Patent Application No. 15167277.1.

*Primary Examiner* — Dao Ho

(74) *Attorney, Agent, or Firm* — Oblon, McClelland, Maier & Neustadt, L.L.P.

(57) ABSTRACT

An apparatus which includes one or more control modules, comprising: a state managing unit configured to manage a current state of the apparatus to control the control modules based on the current state, wherein the state of the apparatus is changed from one to another among a plurality of states with the passing of time; a storage unit configured to store state data for defining processes for controlling the respective control modules in response to a change of the state; and an data editing unit configured to edit the state data stored in the storage unit so as to change a process to be performed in a state among a plurality of states; wherein the state data includes respective state datum corresponding to each state in the plurality of states, and the state managing unit controls the control modules according to the state datum corresponding to the current state.

13 Claims, 20 Drawing Sheets

(56) References Cited

U.S. PATENT DOCUMENTS

| | | |
|---|---|---|
| 7,357,318 B2 | 4/2008 | Honda |
| 7,703,002 B2 | 4/2010 | Barrus et al. |
| 8,126,860 B2 | 2/2012 | Morita |
| 8,275,220 B2 | 9/2012 | Morita |
| 2005/0182638 A1 | 8/2005 | Odent et al. |
| 2007/0266394 A1 | 11/2007 | Odent et al. |
| 2013/0247049 A1 | 9/2013 | Aoki et al. |
| 2014/0075176 A1 | 3/2014 | Sadasue et al. |

FOREIGN PATENT DOCUMENTS

| | | |
|---|---|---|
| JP | 2005-092796 | 4/2005 |
| JP | 4113328 | 7/2008 |
| JP | 2009-245440 | 10/2009 |
| JP | 2010-074431 | 4/2010 |
| JP | 5075549 | 11/2012 |
| WO | WO 99/10784 A2 | 3/1999 |

FIG.14

| STATE DATA No. | ADDED TRANSITION CONDITION |
|---|---|
| 1502 | "To Transition to State Data 2002 when It Meets Condition of Fault" |

| NEW STATE DATA No. | NAME OF NEW STATE DATA |
|---|---|
| 2002 | REPAIR SERVICE |

| TRANSITION CONDITION OF NEW STATE DATA | ACCESS CONTROL |
|---|---|
| "To Return to State Data 1502 when Repair is Completed" | Read Only |

| Entry Action of New State Data | ACCESS CONTROL |
|---|---|
| "To Acquire Data of the Faulted Control Module" | Read/Write |

| Exit Action of New State Data | ACCESS CONTROL |
|---|---|
| "To Notify the User of Repair Completion" | Read/Write |

FIG.15

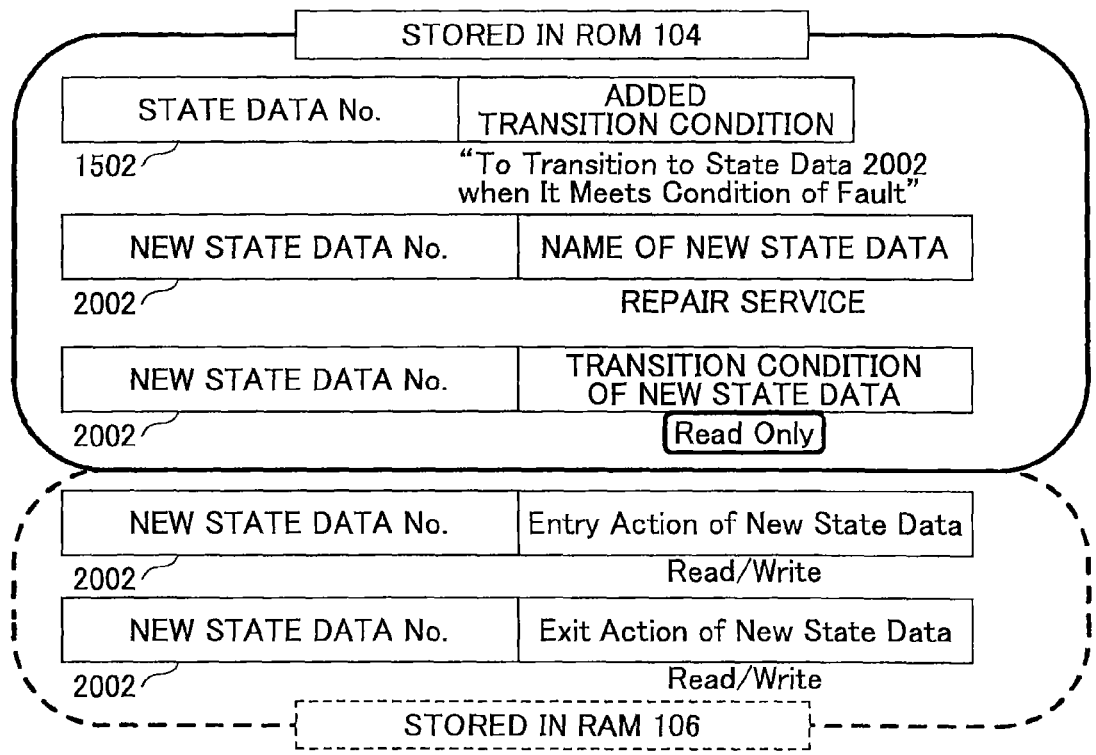

FIG. 24

(1) STATE ACCESS CONTROL POLICY–PRIVATE INFORMATION OF MANUFACTURER

| | MANUFACTURER | | | | | | ADMINISTRATOR | | | | | | OWNER | | | | | |
|---|---|---|---|---|---|---|---|---|---|---|---|---|---|---|---|---|---|---|
| | Read | Write | Exec | Delete | ReWrite | | Read | Write | Exec | Delete | ReWrite | | Read | Write | Exec | Delete | ReWrite | |
| PRODUCTION STATE | T | T | T | F | F | | F | F | T | F | F | | F | F | T | F | F | |
| MARKETING STATE | T | F | T | F | F | | F | F | T | F | F | | F | F | T | F | F | |
| DISPOSAL STATE | F | F | F | T | F | | F | F | F | T | F | | F | F | F | T | F | |

(2) STATE ACCESS CONTROL POLICY–PRIVATE INFORMATION OF ADMINISTRATOR

| | MANUFACTURER | | | | | ADMINISTRATOR | | | | | OWNER | | | | |
|---|---|---|---|---|---|---|---|---|---|---|---|---|---|---|---|
| | Read | Write | Exec | Delete | ReWrite | Read | Write | Exec | Delete | ReWrite | Read | Write | Exec | Delete | ReWrite |
| PRODUCTION STATE | – | – | – | – | – | – | – | – | – | – | – | – | – | – | – |
| MARKETING STATE | F | F | T | F | F | T | T | T | F | F | F | F | T | F | F |
| DISPOSAL STATE | F | F | T | T | F | F | F | F | T | F | F | F | F | T | F |

(3) STATE ACCESS CONTROL POLICY–PRIVATE INFORMATION OF OWNER

| | MANUFACTURER | | | | | ADMINISTRATOR | | | | | OWNER | | | | |
|---|---|---|---|---|---|---|---|---|---|---|---|---|---|---|---|
| | Read | Write | Exec | Delete | ReWrite | Read | Write | Exec | Delete | ReWrite | Read | Write | Exec | Delete | ReWrite |
| PRODUCTION STATE | – | – | – | – | – | – | – | – | – | – | – | – | – | – | – |
| MARKETING STATE | F | F | T | F | F | F | F | T | F | F | T | T | T | F | F |
| DISPOSAL STATE | F | F | F | T | F | F | F | F | T | F | F | F | F | T | F |

(4) STATE ACCESS CONTROL POLICY–PUBLIC INFORMATION OF MANUFACTURER

| | MANUFACTURER | | | | | ADMINISTRATOR | | | | | OWNER | | | | |
|---|---|---|---|---|---|---|---|---|---|---|---|---|---|---|---|
| | Read | Write | Exec | Delete | ReWrite | Read | Write | Exec | Delete | ReWrite | Read | Write | Exec | Delete | ReWrite |
| PRODUCTION STATE | T | T | T | F | F | T | F | T | F | F | T | F | T | F | F |
| MARKETING STATE | T | F | T | F | F | T | F | T | F | F | T | F | T | F | F |
| DISPOSAL STATE | F | F | F | T | F | F | F | F | T | F | F | F | F | T | F |

(5) STATE ACCESS CONTROL POLICY–PUBLIC INFORMATION OF ADMINISTRATOR

| | MANUFACTURER | | | | | ADMINISTRATOR | | | | | OWNER | | | | |
|---|---|---|---|---|---|---|---|---|---|---|---|---|---|---|---|
| | Read | Write | Exec | Delete | ReWrite | Read | Write | Exec | Delete | ReWrite | Read | Write | Exec | Delete | ReWrite |
| PRODUCTION STATE | – | – | – | – | – | – | – | – | – | – | – | – | – | – | – |
| MARKETING STATE | T | F | T | F | F | T | T | T | F | F | T | F | T | F | F |
| DISPOSAL STATE | F | F | F | T | F | F | F | F | T | F | F | F | F | T | F |

(6) STATE ACCESS CONTROL POLICY–PUBLIC INFORMATION OF OWNER

| | MANUFACTURER | | | | | ADMINISTRATOR | | | | | OWNER | | | | |
|---|---|---|---|---|---|---|---|---|---|---|---|---|---|---|---|
| | Read | Write | Exec | Delete | ReWrite | Read | Write | Exec | Delete | ReWrite | Read | Write | Exec | Delete | ReWrite |
| PRODUCTION STATE | – | – | – | – | – | – | – | – | – | – | – | – | – | – | – |
| MARKETING STATE | T | F | T | F | F | T | F | T | F | F | T | T | T | F | F |
| DISPOSAL STATE | F | F | F | T | F | F | F | F | T | F | F | F | F | T | F |

T: True (Allowed To Access)
F: False (Not Allowed To Access)
–: No Data

APPARATUS, METHOD FOR CONTROLLING APPARATUS, AND PROGRAM

BACKGROUND OF THE INVENTION

1. Field of the Invention

The present technology relates to an apparatus and a method for controlling the apparatus.

2. Description of the Related Art

In a technical field related to embedded apparatuses, since modules configuring the embedded apparatuses store important electronic information, high security is required to protect such electronic information. Here, the embedded apparatus means embedding modules in home electric appliances, machines, etc. to achieve specific functions.

Also, the embedded apparatuses are required to be safety maintained through a lifecycle which includes a plurality of stages such as production, distribution, disposal, etc., that is, to consistently maintain the safety of the apparatuses. For example, it is highly required to assure the safety in a case where users of the apparatuses are changed in the respective stages of the lifecycle.

A lifecycle management system for providing apparatuses containing electronic information resources with apparatus operational functions or access control functions based on the stage of the lifecycle, is known (for example, Japanese Laid-open Patent Publication No. 2009-75968). According to such system, by controlling the access of the users to the electronic information based on the stage of the lifecycle, it enables the users who have access to the electronic information to be changed according to the stage of the lifecycle, and the electronic information can be deleted which could cause to create the security hole.

However, the stages included in the lifecycle may vary according to the destination (location) of the home electric appliances, machines, or the like. For example, destinations where the disposal stage is not included in the lifecycle are expected as well as destinations where the disposal stage is included in the lifecycle. Also, details in the respective stages may vary. For example, in the distribution stage, the details of the stage may be different between a case where vehicles are used for distribution and a case where ships are used for distribution.

In the prior art, it has been impossible to change the types or details of the stages included in the lifecycle of the modules (hereinafter referred to as control modules) configured in the embedded apparatuses. Therefore, the labor for designing the apparatus or costs for manufacturing the apparatus increase since the design and the manufacture of the module are required at every destination having different types or details of the stages included in the lifecycle.

RELATED ART DOCUMENT

Patent Document

[Patent Document 1]: Japanese Laid-open Patent Publication No. 2009-75968

SUMMARY OF THE INVENTION

An object of disclosure of the present technology is to make common the control module in the apparatus even if the types or details of the stages included in the lifecycle vary according to the destination of the appliances, machines, or the like.

The following configuration is adopted to achieve the aforementioned object.

In one aspect of the embodiment, there is provided an apparatus which includes one or more control modules, comprising: a state managing unit configured to manage a current state of the apparatus to control the control modules based on the current state, wherein the state of the apparatus is changed from one to another among a plurality of states with the passing of time; a storage unit configured to store state data for defining processes for controlling the respective control modules in response to a change of the state; and an data editing unit configured to edit the state data stored in the storage unit so as to change a process to be performed in a state among a plurality of states; wherein the state data includes respective state datum corresponding to each state in the plurality of states, and the state managing unit controls the control modules according to the state datum corresponding to the current state.

Other objects, features and advantages of the present invention will become more apparent from the following detailed description when read in conjunction with the accompanying drawings.

BRIEF DESCRIPTION OF THE DRAWINGS

FIG. 14 is an illustration diagram of an example of data transmitted from an input/output unit to the memory access controller;

FIG. 15 is an illustration diagram for showing an example of arrangement of the state data;

FIG. 24 is a diagram for showing an example of a state access control policy;

DETAILED DESCRIPTION OF THE PREFERRED EMBODIMENTS

Figure 1:
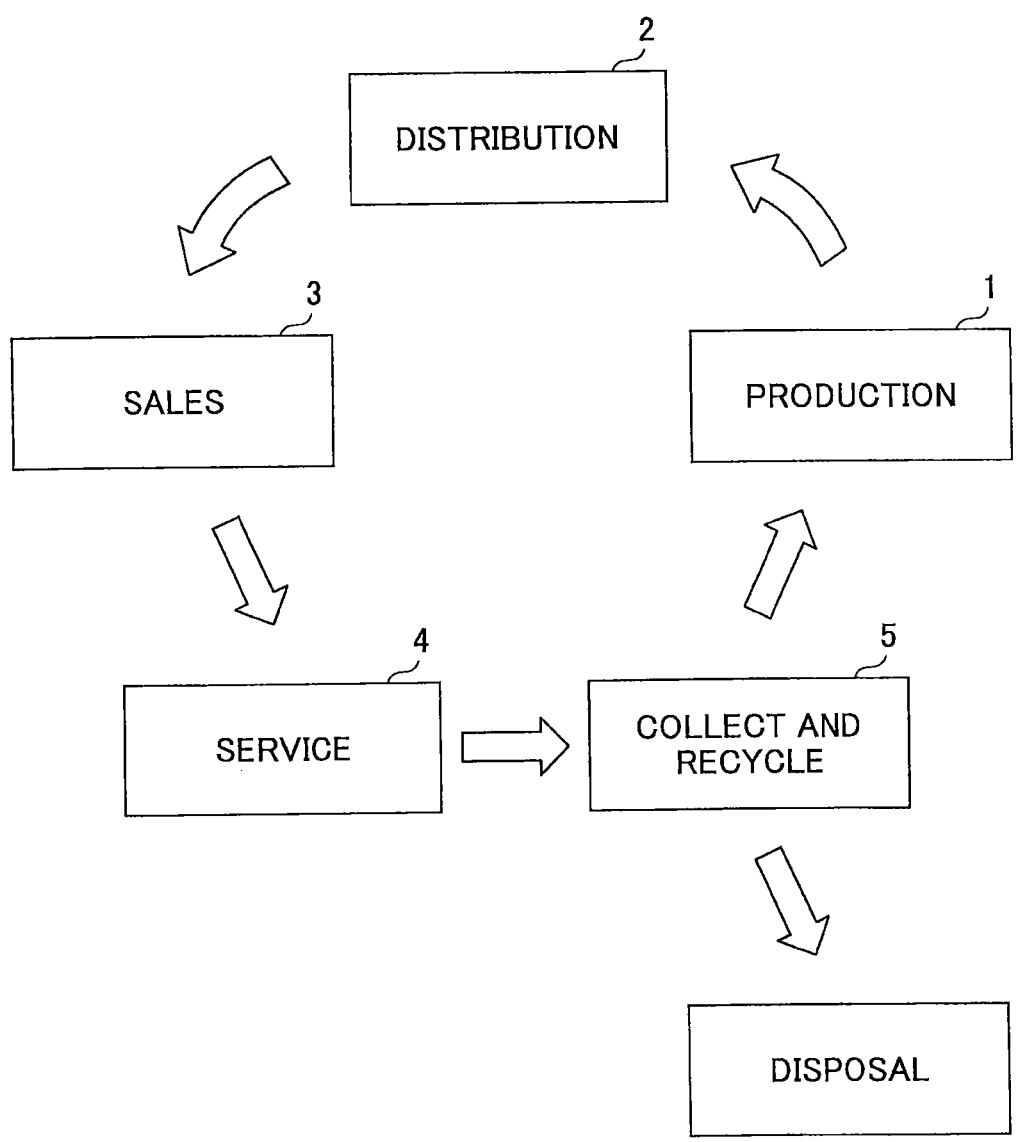
FIG. 1 is an illustration diagram for showing an example of a lifecycle of an embedded apparatus.

Herein below embodiments will be described with reference to accompanying drawings. The respective embodiments described below are not limiting examples. Additionally, in the present specification and drawings, an identical reference numeral will be applied to elements or the like that have substantially similar functions and configurations, and descriptions thereof will be omitted.

EMBODIMENT

<Lifecycle>

FIG. 1 is an illustration diagram for showing an example of a lifecycle of an embedded apparatus. The lifecycle of the embedded apparatus includes a plurality of stages. As an example, a production stage 1 for manufacturing the embedded apparatus in factory, a distribution stage 2 for transporting the embedded apparatus to market (by transportation means such as trucks, etc.), a sales stage 3 for marketing the embedded apparatus in a dealer's store, a service stage 4 for delivering service such as repairing the apparatus in a case where the apparatus fails to operate when the user operates, a collection and recycle stage 5 for collecting and recycling the embedded apparatus in view of environmental protection are included in the lifecycle. The lifecycle may further include a disposal stage in which the embedded apparatus is discarded or may include the disposal stage instead of the collection and recycle stage, according to the type of the embedded apparatus.

The lifecycle shown in FIG. 1 is an example, and may differ according to the destinations (locations) such as the country, region, or the like. In the present embodiment, use of the embedded apparatus through such stages is referred to as the "lifecycle". That is, the lifecycle means a combination of the respective stages (or states) that vary with the passage, of time. For example, in view of environmental protection, the collection and recycle stage has to be surely performed, and the lifecycle has to make transition through the legitimate cycle (stages) to verify the operation of the lifecycle.

<Embedded Apparatus>

In the following, as an example of an apparatus that has a lifecycle state management function, an embedded apparatus (hereinafter referred to as the "apparatus") such as a vehicle that has the lifecycle state management function, will be described. That is, the embedded apparatus is exemplified as the apparatus.

Figure 2:
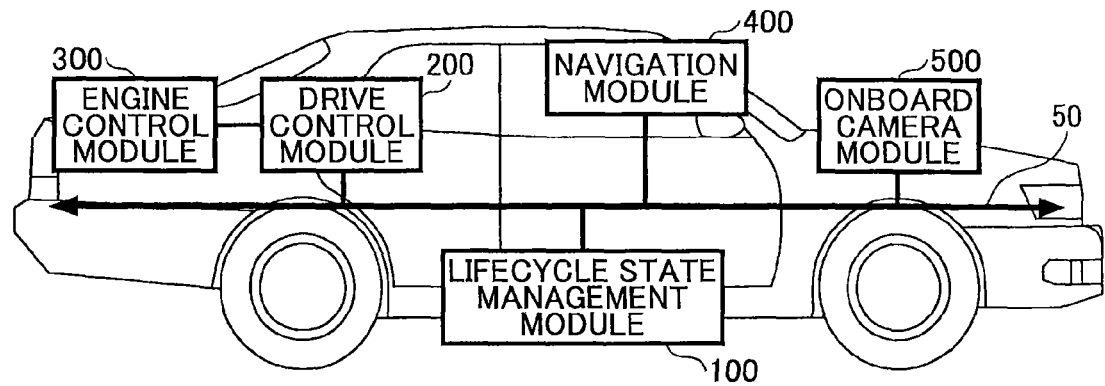
FIG. 2 is an illustration diagram for showing an example of a control module of a vehicle that has a lifecycle state management function.

FIG. 2 is an illustration diagram for showing an example configuration of a control module of the vehicle that has the lifecycle state management function. The vehicle of the present embodiment includes a lifecycle state management module 100 for managing the respective stages (states) of the lifecycle of the entire vehicle and one or more control modules for storing data in which access control policies according to the respective stages of the lifecycle are defined. The lifecycle state management module 100 and some of the control modules are connected with each other through a bus 50, thereby forming a network such as a CAN (Controller Area Network), a LIN (Local Interconnect Network), an Ethernet, or a LAN (Local Area Network). The lifecycle state management module 100 and the one or more control modules may also be connected by the FlexRay. In FIG. 2, the lifecycle state management module 100 and the some of the control module are connected through the bus 50. In FIG. 1, a drive control module 200, an engine control module 300, a navigation module 400 and an onboard camera module 500 are exemplified as the control modules.

The lifecycle state management module 100 manages the respective stages of the lifecycle which are unique to the entire vehicle and authentication information of the users. The lifecycle state management module 100 recognizes the configuration of the one or more control modules and gives the one or more control modules instructions to control them. An access control policy (hereinafter referred to as the "state access control policy") is set to control access to data stored in the one or more control modules in accordance with the respective stages of the lifecycle. The lifecycle state management module 100 gives instructions based on the state access control policy of the control module to be controlled, or accepts requests from the control module to control them, in the respective stages of the lifecycle. The lifecycle state management module 100 is informed of a state of the lifecycle of the apparatus and the role of an entity who needs to access the apparatus (hereinafter referred to as the "accessing entity") through the bus 50 in response to a request from the control modules. Here, the role indicates a role of the accessing entity and is used for determining whether the accessing entity has access authority. The role may be set for a human or may be set for an entity other than a human such as a specific division or factory within a company.

For example, the instructions and data for controlling a control module accessible by a salesman in the sales stage 3 of the lifecycle are expected to be different from those for controlling a control module accessible by a mechanic when repair is required in the service stage 4 of the lifecycle. In such a case, the salesman (or a dealer) is informed as a role allowed to access the module in the sales stage 3, and the mechanic (or a repair garage) is informed as a role allowed to access the module in the service stage 4. The lifecycle state management module 100 manages the authentication information of the accessing entity (the salesman and the mechanic) of the vehicle, thereby associating the accessing entity with the state access control policy. Therefore, the information of the control module for the repair, which needs to be accessed by the mechanic in the repair, is prevented from being broken by accessing the information for the repair by the salesman, or the like.

The drive control module 200 controls vehicle drive. The engine control module 300 controls the engine of the vehicle. The navigation module 400 performs a navigational operation for providing the vehicle with route guidance to a destination. The onboard camera module 500 controls the onboard camera installed in the vehicle.

The drive control module 200, the engine control module 300, the navigation module 400 and the onboard camera module 500 respectively store the data in which the state access control policy is defined. The roles which are allowed to access the data of certain control modules in the respective stages of the lifecycle are described in the state access control policy. That is, the role which is allowed access may be changed when the stage of the lifecycle is changed.

The drive control module 200, the engine control module 300, the navigation module 400 and the onboard camera module 500 receive the stage of the lifecycle as of the time and the role of the accessing entity from the lifecycle state management module 100 respectively, and thereby determining accessibility to the data if needed. Failing to change the role or an error in changing the role can be prevented, which may occur in a case where the roles are changed by the respective operations, by changing the respective roles which are allowed to access the control modules included in the vehicle together in accordance with the change of the stage of the lifecycle.

Also, in a case where the data in which the state access control policy is defined is stored in the lifecycle state management module 100, the accessibility to the data may be determined based on the stage of the lifecycle of the lifecycle state management module 100 and the role of the accessing entity.

The lifecycle state management module 100 and the respective control modules are connected so that the lifecycle state management module 100 can directly send/receive the data to/from the control modules through the bus 50, shown as connections between the lifecycle state management module 100, the drive control module 200, the navigation module 400 or the onboard camera module 500. Or, the lifecycle state management module 100 and the control modules may be connected so that the lifecycle state management module 100 can indirectly send/receive the data to/from a control module through another control module shown as the connection between the lifecycle state management module 100, the drive control module 200 and the engine control module 300. Also, the lifecycle state management module 100 and the control modules may be connected through a wired network or a wireless network as well as the bus 50. In any case, communication between the lifecycle state management module 100 and the control modules are performed in compliance with a certain protocol.

As described above, the drive control module 200, the engine control module 300, the navigation module 400 and the onboard camera module 500 respectively include the state access control policy. Therefore, the respective control modules can independently verify the access authority to the data. Also, the access authority may be verified by the lifecycle state management module 100 instead of the respective control modules wherein association between identifiers of the data stored in the respective control modules and the state access control policy of the data is stored in the lifecycle state management module 100. In this case, the lifecycle state management module 100 determines the accessibility based on the state access control policy associated with the data stored in the respective control modules, thereby notifying the control modules of the determination result. The respective control modules, receiving the determination result sent from the lifecycle state management module 100, perform operations for giving a permission to access the data, or the like.

The apparatus to install the lifecycle state management function means all the control modules which are controlled under the common lifecycle. That is, when a vehicle is managed in accordance with the lifecycle, the vehicle is the apparatus having the lifecycle. Whereas, when a board installed in a certain commercial product is managed in accordance with the lifecycle, the board is the apparatus having the lifecycle. The present embodiment is effective specially, when the life of the data stored in the control modules included in the apparatuses coincide with the life of the apparatus.

<Hardware Configuration of Lifecycle Management Module 100>

Figure 3:
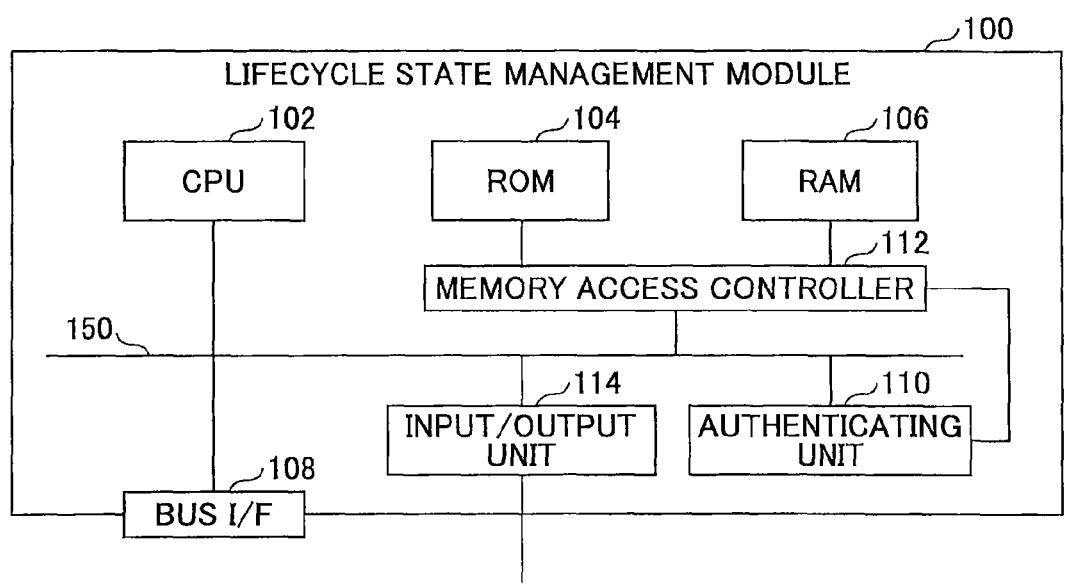
FIG. 3 is a block diagram for illustrating a hardware configuration of a lifecycle state management module of the present embodiment.

FIG. 3 is a block diagram for illustrating the hardware configuration of the lifecycle state management module 100 of the present embodiment. As shown in FIG. 3, the lifecycle state management module 100 of the present embodiment includes a CPU (Central Processing Unit) 102 for controlling the operation of the entire lifecycle state management module 100, a ROM (Random Access Memory) 104 for storing program to activate the CPU 102 such as an IPL (Initial Program Loader), and RAM (Random Access Memory) 106 for use as a working area for the CPU 102.

Further, the lifecycle state management module 100 includes a bus I/F 108, which is an I/F (interface) to the bus 50, for receiving control signals such as operation signals output from the lifecycle state management module 100 to the respective control modules, or accesses from the respective control modules to be controlled.

Also, the lifecycle state management module 100 includes an authenticating unit 110 for determining if the attempted access is a permitted user or not, and a memory access controller 112 for setting an accessible area in the ROM 104 and the RAM 106 in accordance with the role of the accessing entity in a case where the accessing entity is determined as a permitted user by the authenticating unit 110. The memory access controller 112 is an example of the memory access controlling unit.

Further, the lifecycle state management module 100 includes an input/output unit 114 for transmitting data for editing, in accordance with the respective destination, the data and the program in the ROM 104 and the RAM 106 such as adding, correcting, or deleting; and a bus line 150 for electrically connecting the above described units with each other as shown in FIG. 3, such as an address bus, a data bus, or the like.

The CPU 102, the ROM 104, the RAM 106, the memory access controller 112 and the authenticating unit 110 may have a configuration included in a microcomputer. Also, the authenticating unit 110 may be hardware such as an authentication device, or may be software.

The CPU 102 provides programmed functions by receiving user data, state data, a control target data and by retrieving programs for the lifecycle state management module from the ROM 104 and/or RAM 106, to execute them. The user data, the state data, the control target data, and the programs for the lifecycle state management module will be described below.

The authenticating unit 110 authenticates the accessing entity based on the authentication information received from the input/output unit 114. The authenticating unit 110 authenticates the accessing entity, which has input the authentication information, based on an access ID, a password and the user data included in the authentication information received from the input/output unit 114.

The authenticating unit 110 may use authentication technologies, other than the above mentioned password authentication, such as challenge-response authentication, the a one-time password, biometrics authentication using biological information such as a fingerprint, voice print or iris pattern, or PKI (Public Key Infrastructure) to verify the access authority of the accessing entity. In a case where the access authority of the accessing entity is verified by PKI, the accessing entity requests a certificate authority to issue a digital certificate, providing its public key. The certificate authority examines the public key processed by the accessing entity based on filed application documents and the like, thereby issuing the digital certificate. A digital signature is included in the digital certificate as well as possessor information of the public key. The accessing entity sends the digital certificate to the lifecycle state management module 100. The authenticating unit 110 included in the lifecycle state management module 100 decodes the digital certificate by the public key of the certificate authority, thereby verifying the information of the accessing entity and the digital signature of the certificate authority as well as obtaining the public key of the accessing entity. By verifying the information of the accessing entity and the digital signature of the certificate authority, the access authority of the accessing entity can be verified.

In a case where the access authority of the accessing entity is verified by the authenticating unit 110, the memory access controller 112 sets, based on an instruction from the authenticating unit 110 and the role of the accessing entity, accessible areas in the ROM 104 and the RAM 106 where the accessing entity is permitted to store the program in accordance with its role. For example, the accessing entity can store different programs according to the respective destinations, thereby restricting accessible modules to be controlled. Further, in the accessible modules to be controlled, the accessing entity can restrict accessible information by the state access control policy stored in any one of or both of the ROM 104 and the RAM 106.

In a case where the access authority of the accessing entity is not verified by the authenticating unit 110, the CPU 102 sets, based on an instruction from the authenticating unit 110, the entire apparatus (entire vehicle) in a mode where the apparatus cannot be used.

The input/output unit 114 inputs the authentication information for authenticating the user, and also inputs the data to be stored in any one of or both of the ROM 104 and the RAM 106 according to the respective destinations. Thus, editing such as adding a program in any one of or both of the ROM 104 and the RAM 106 can be performed. Also, the input/output unit 114 can perform editing such as correcting or deleting the program stored in any one of or both of the ROM 104 and the RAM 106.

The input/output unit 114 is configured by an apparatus capable of providing the authenticating unit 110 with the authentication information, such as an IC card reader, or an apparatus which retrieves the authentication information of the accessing entity stored in a vehicle key when the vehicle key is inserted into the keyhole of the vehicle. The authentication information may be received by the input/output unit 114 through a wired transmission or a wireless transmission. For example, the authentication information can be wirelessly transmitted by using a mobile terminal such as a smartphone or a mobile phone.

Also, the input/output unit 114 may be configured by an interface device being in compliance with a standard such as RS232C, and the data may be received through the interface. Further, the input/output unit 114 may be configured by a network apparatus, and the data may be transmitted from a mobile terminal such as a smart phone to the network apparatus.

Additionally, the programs for the lifecycle state management module (described above) may be stored in an installable or an executable format in a computer readable recording medium such as a media for recording data or a CD-ROM, thereby being distributed commercially.

<Hardware Configuration of Drive Control Module 200>

Figure 4:
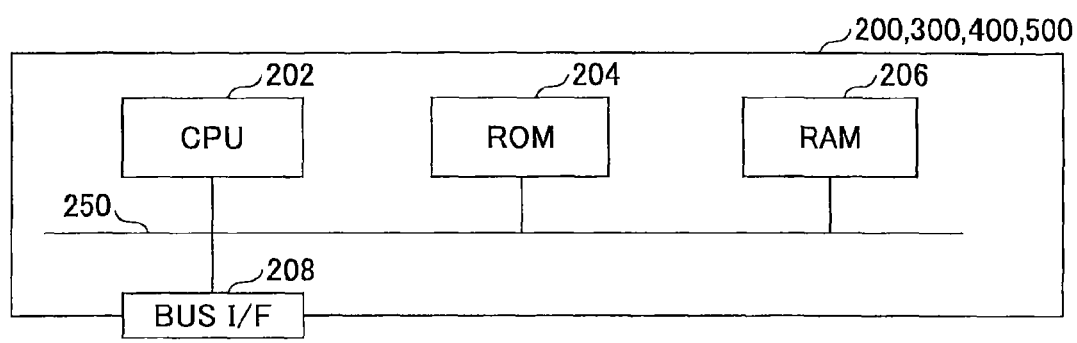
FIG. 4 is a block diagram for illustrating a hardware configuration of a drive control module of the present embodiment.

FIG. 4 is a block diagram for illustrating a hardware configuration of the drive control module 200 of the present embodiment. As shown in FIG. 4, the control module 200 of the present embodiment includes a CPU 202 for controlling the operation of the entire control module 200, a ROM 204 for storing programs to activate the CPU 202 such as an IPL (Initial Program Loader). Further, the drive control module 200 includes, a RAM 206 for use as a working area for the CPU 202, and a bus I/F 208, which is an I/F (interface) to the bus 50, for receiving control signals such as operation signals output from the drive control module to the respective control modules, or accesses from the respective control modules to be controlled. Also, the drive control module 200 includes a bus line 250 for electrically connecting the above described units with each other as shown in FIG. 4, such as an address bus, a data bus, or the like. The drive control module 200 may include other hardware blocks.

The CPU 202 provides the functions programmed for the drive control module, by loading the data stored in the ROM 204 into the RAM 206 to receive and execute it. This process causes the CPU 202 to perform access control based on the lifecycle.

The bus I/F 208 is used as an output means for outputting a state of the lifecycle notification request, by sending requests to notify the stages of the lifecycle to units or modules external to the control module 200, and also used as an input means for inputting a notification of the stage of the lifecycle and the role of the accessing entity transmitted by the lifecycle state management module 100 in response to the lifecycle notification request.

Also, an interface for accepting input of the authentication information of the accessing entity may be disposed in the drive control module 200, thereby using the bus I/F 208 as an output means for outputting the authentication information to the lifecycle state management module 100.

Additionally, another network interface may be connected other than the bus I/F 208. Also, the bus I/F 208 may be solely connected with the drive control module 200, or the network I/F may be connected as well as the bus I/F 208.

Additionally, the programs for the drive control module (described above) may be stored in an installable or an executable format in a computer readable recording medium such as a media for recording data or a CD-ROM, thereby being distributed commercially.

<Hardware Configuration of Engine Control Module 300>

A similar hardware configuration to that of the drive control module 200 described above is applied to the engine control module 300. However, in this case, programs to control the engine control module 300 are stored in the ROM 204. In this case, the programs for the engine control module may also be stored in an installable or an executable format in a computer readable recording medium such as a media for recording data or a CD-ROM, thereby being distributed commercially.

<Hardware Configuration of Navigation Module 400>

A similar hardware configuration to that of the drive control module 200 described above is applied to the navigation control module 400. However, in this case, programs to control the navigation control module 400 are stored in the ROM 204. In this case, the programs for the navigation control module may also be stored in an installable or an executable format in a computer readable recording medium such as a media for recording data or a CD-ROM, thereby being distributed commercially.

<Hardware Configuration of Onboard Camera Module 500>

A similar hardware configuration to that of the drive control module 200 described above is applied to the onboard camera module 500. However, in this case, programs to control the onboard camera module 500 are stored in the ROM 204. In this case, the programs for the onboard camera control module may also be stored, in an installable or an executable format in a computer readable recording medium such as a media for recording data or a CD-ROM, thereby being distributed in commercially.

Additionally, a computer readable recording medium such as a CD-R (Compact Disc Recordable), DVD (Digital Versatile Disk), or a Blu-ray disc is also exemplified as a detachable recording medium for storing the program.

<Functional Configuration of Present Embodiment>

Figure 5:
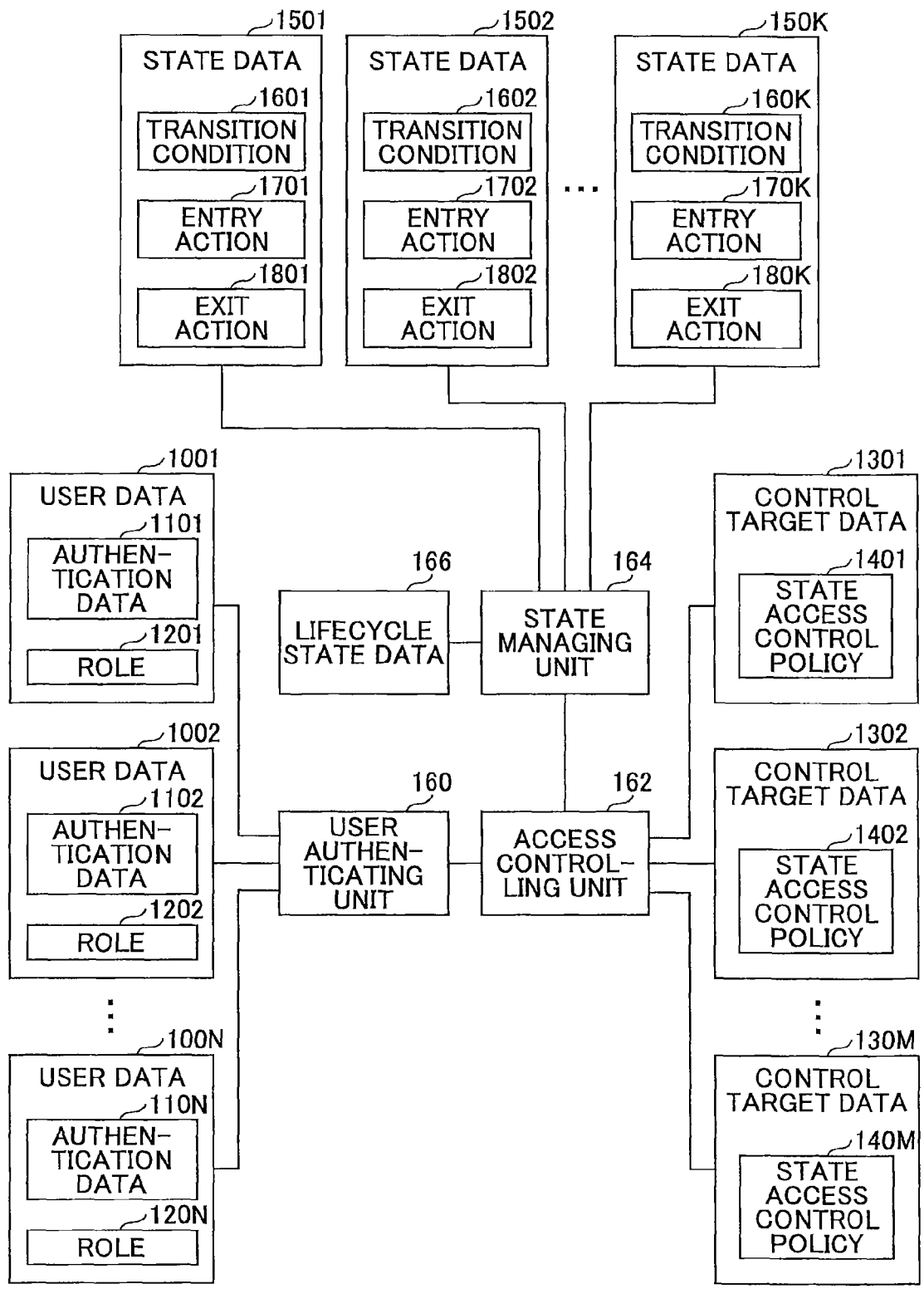
FIG. 5 is a block diagram for illustrating the functional configuration of an apparatus of the present embodiment.

In the following, a functional configuration of the present embodiment will be described. FIG. 5 is a block diagram for illustrating the functional configuration of the lifecycle state management module 100 in the apparatus of the present embodiment. In FIG. 5, data stored in any one of or both of the ROM 104 and the RAM 106 is shown as well as the functional configuration of the lifecycle state management module 100.

<Functional Configuration of Lifecycle State Management Module 100>

The lifecycle state management module 100 includes a user authenticating unit 160, an access controlling unit 162 and a state managing unit 164. The access controlling unit 162 is an example of a data access controlling unit. These units are functions or means achieved by operation of any element or unit shown in FIG. 3 in accordance with instructions of the CPU 102 according to a user authentication program, an access control program or a state management program that are programs for the lifecycle state management module retrieved from the ROM 104 to be loaded in the RAM 106.

That is, the user authenticating unit 160 is a function or a means achieved by operation of any element or unit shown in FIG. 3 in accordance with instructions of the CPU 102 according to the user authentication program that is retrieved from the ROM 104 to be loaded in the RAM 106. Also, the access controlling unit 162 is a function or a means achieved by operation of any element or unit shown in FIG. 3 in accordance with instructions of the CPU 102 according to the access control program that is retrieved from the ROM 104 to be loaded in the RAM 106. Further, the state managing unit 164 is a function or a means achieved by operation of any element or unit shown in FIG. 3 in accordance with instructions of the CPU 102 according to the state management program that is retrieved from the ROM 104 to be loaded in the RAM 106. Additionally, the dependency of the programs is described as an example, the function of the lifecycle state management module may be achieved with programs having different dependencies.

(Functions of Lifecycle State Management Module 100)

In the following, with reference to FIG. 3 and FIG. 5, the functions of the lifecycle state management module 100 are described in detail. Additionally, in the following, relations with elements or units important to achieve the respective functions of the lifecycle state management module 100 among the elements of units shown in FIG. 3 are also described in order to describe the respective functions of the lifecycle state management module 100.

The user authenticating unit 160 in the lifecycle state management module 100 shown in FIG. 5 is achieved by instructions from the CPU 102 shown in FIG. 3, input/output unit 114 shown in FIG. 3 and user data 1001-100N (wherein N is a positive integer) stored in the ROM 104. The user data 1001-100N may have been registered in advance, where N indicates the number of users. Further, authentication data 1101-110N and roles 1201-120N, with respect to the user data 1001-100N, are stored in the ROM 104.

The user authenticating unit 160 operates in response to the input of authentication information of the accessing entity from the input/output unit 114, and verifies the access authority of the accessing entity based on the authentication information and authentication data corresponding to any one of the user data 1001-100N. The user authenticating unit 160 outputs the verification result, and outputs the role of the accessing entity when the access authority of the accessing entity is verified. Specifically, the user authenticating unit 160 searches for an access ID which is included in the authentication information of the accessing entity input from the input/output unit 114 from the authentication data 1101-110N corresponding to the user data 1001-100N, thereby determining whether the user data exists or not. When existing user data can be found, the authenticating unit 110 determines whether the password included in the authentication information matches the authentication data corresponding to the user data found in the search, thereby verifying the access authority of the accessing entity. The authenticating unit 110 outputs information indicating that the access authority of the accessing entity is verified and the role of the accessing entity to the access controlling unit 162 in a case where the access authority of the accessing entity is verified.

The access controlling unit 162 in the lifecycle state management module 100 shown in FIG. 5 is achieved by instructions of the CPU 102 shown in FIG. 3, the memory access controller 112 and the control target data 1301-130M (wherein M is a positive integer) stored in the ROM 104. Further, the state access control policies 1401-140M with respect to the control target data 1301-130M are stored in the ROM 104. Here, the control target data 1301-130M may be associated with the respective control modules installed in the vehicle such as the drive control module 200, the engine control module 300, the navigation module 400 and the onboard camera module 500. That is, the respective control modules include the control target data.

The access controlling unit 162 determines whether the accessing entity is allowed to access the control target data 1301-130M or not, in a certain lifecycle state. The control target data 1301-130M respectively includes the state access control policies 1401-140M. The state access control policies 1401-140M respectively include the accessible user information and the accessible role in a given lifecycle state. The access controlling unit 162 determines whether the accessing entity has the access authority for accessing the control target data or not by referring to the state access control policies 1401-140M.

Specifically, the access controlling unit 162 acquires the state of lifecycle from the state managing unit 164, and acquires the role of the accessing entity from the user authenticating unit 160. The access controlling unit 162 identifies, by referring to the state access control policies 1401-140M corresponding to the control target data 1301-130M, the accessible role (or roles) in the state (stage) of lifecycle acquired from the state managing unit 164, and thereby determines the accessibility of the accessing entity by determining whether the role of the accessing entity is found in the identified role (or roles).

The state managing unit 164 in the lifecycle state management module 100 shown in FIG. 5 is achieved by instructions of the CPU 102 shown in FIG. 3 and state data 1501-150K (wherein K is a positive integer) stored in the ROM 104. The content of processes performed when a state transition is requested is described in the state data 1501-150K. Further, in the ROM 104, transition conditions 1601-160K, entry actions 1701-170K and exit actions 1801-180K, respectively corresponding to the state data 1501-150K, are stored.

Conditions to transit, such as that a certain data exists or that a certain data meets a formal requirement, are defined in the transition conditions 1601-160K. Processes to maintain security in the stage after the state (stage) transition, such as an initial setting of security information, or the like are defined in the entry actions 1701-170K. For example, a process for preparing a private key for communication, or the like is defined in the entry actions 1701-170K. Processes to delete information, which may cause a security vulnerability if it still remained after transition to a next stage of the lifecycle, or to overwrite such information are defined in the exit actions 1801-180K. For example, a setting for deleting log data which supplies personal information of a main user of the apparatus in the previous stage of the lifecycle or a setting for preventing overwriting the private key to prevent tampering is defined in the exit actions 1801-180K.

The state managing unit 164, with reference to the lifecycle state data 166 in response to an access request from the access controlling unit 162, acquires the current stage (state) of lifecycle at the present to inform the access controlling unit 162. Here, the lifecycle state data 166 is to indicate the current stage of lifecycle at the time of management to keep current (unique) with respect to the entire apparatus. The lifecycle state data 166 is changed every time a state transition for changing the stage of lifecycle occurs. For example, the lifecycle state data 166 may be changed by respective persons who change the stage of lifecycle in the respective stages. The state managing unit 164 performs processes described in the state data 1501-150K when the state transition is requested. Also, the state managing unit 164 edits the state data 1501-150K to update it so as to provide a new service for users of the apparatus according to the respective destinations. Further, in addition to the state data 1501-150K, data other than the state data 1501-150K and programs may also updated in the respective stages of the lifecycle, according to the respective destinations.

<Process for Editing State Data>

In the following, a process for editing the state data 1501-150K will be described.

Figure 6:
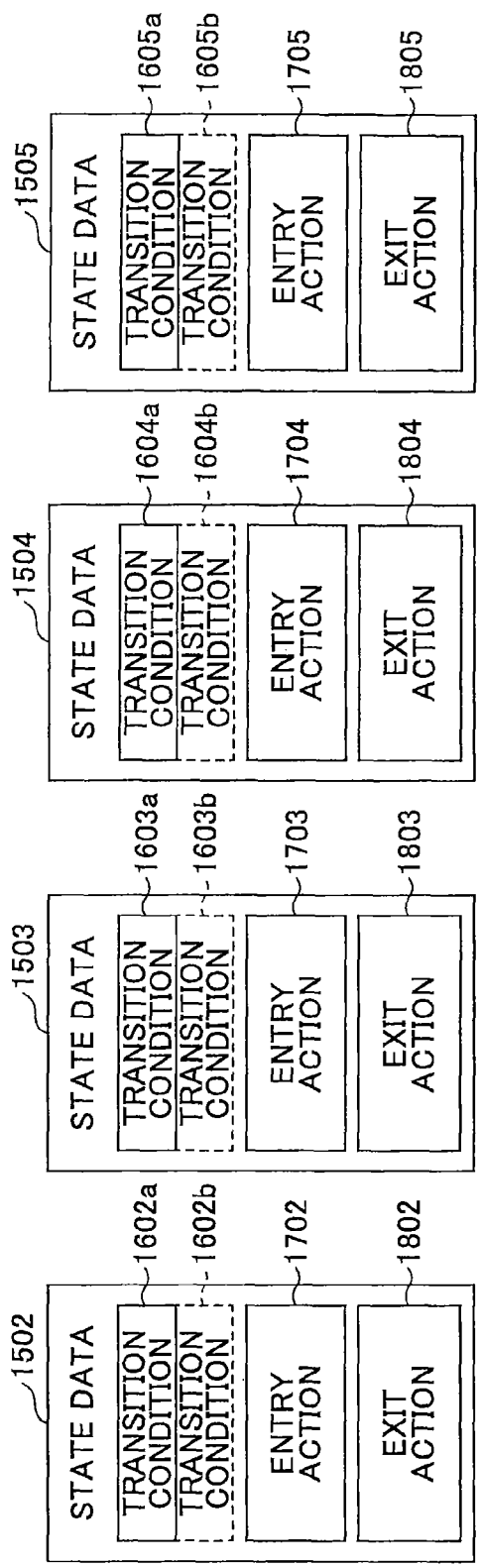
FIG. 6 is an illustration diagram showing state data before being edited.

First, conditions for performing the process are described. One or both of the ROM 104 and the RAM 106 of the lifecycle state management module 100 store the state data 1502-1505. FIG. 6 is an illustration diagram showing the state data 1502-1505 before being edited. For example, the state data 1502 corresponds to the distribution stage 2, the state data 1503 corresponds to the sales stage 3, the state data 1504 corresponds to the service stage 4, the state data 1505 corresponds to the collection and recycle stage 5. In this case, a new state data 2002 will be added to the state data 1502. In the state data 1502-1505, transition conditions 1602b-1605b are formed for the new state data 2002, though actual transition conditions are not set in them as of yet. In FIG. 6, non-rewritable data is shown with solid lines while rewritable data is shown with dashed lines.

Figure 7:
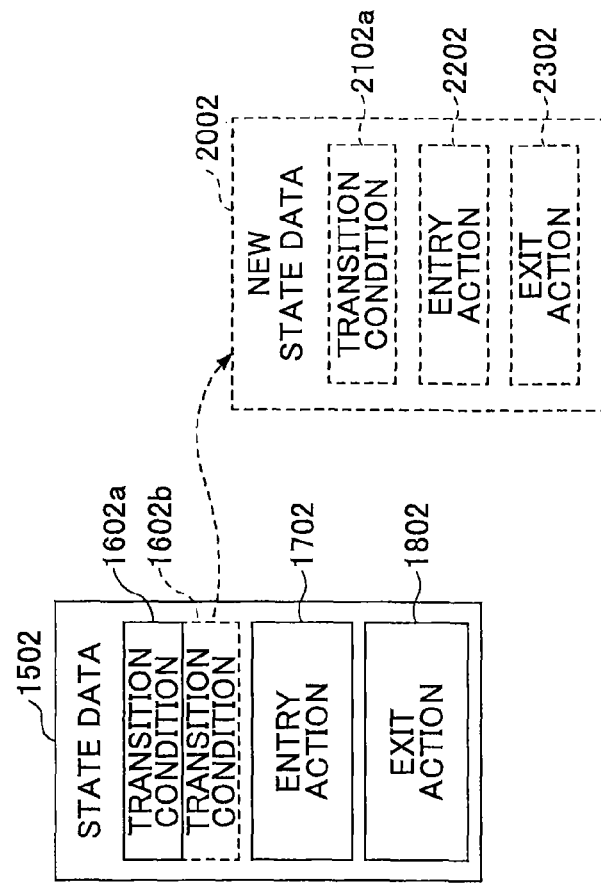
FIG. 7 is an illustration diagram of state data to which new state data is added and the new state data.

FIG. 7 is an illustration diagram of the state data 1502 to which a new state data is added and the state data 2002 which is added to the state data 1502. As shown in FIG. 7, the state data 2002 is newly added to the state data 1502 among the state data 1502-1505.

The new state data 2002 is associated with the original state data 1502 to which the state data 2002 is added. The transition condition 1602b of the original state data 1502 and the new state data 2002 are input from the input/output unit 114 shown in FIG. 3. The content of the input data will be described below. Conditions for transiting to the new state data 2002 and the like are described in the transition condition 1602b.

Figure 8:
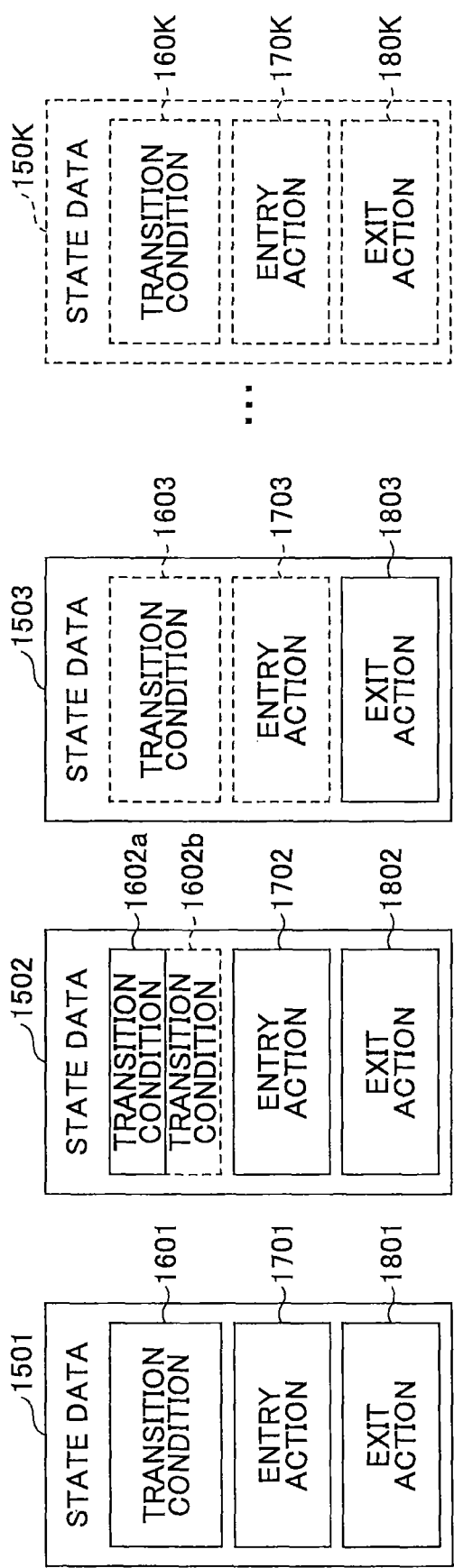
FIG. 8 is an illustration diagram of controlling storage areas to edit the state data.
Figure 9:
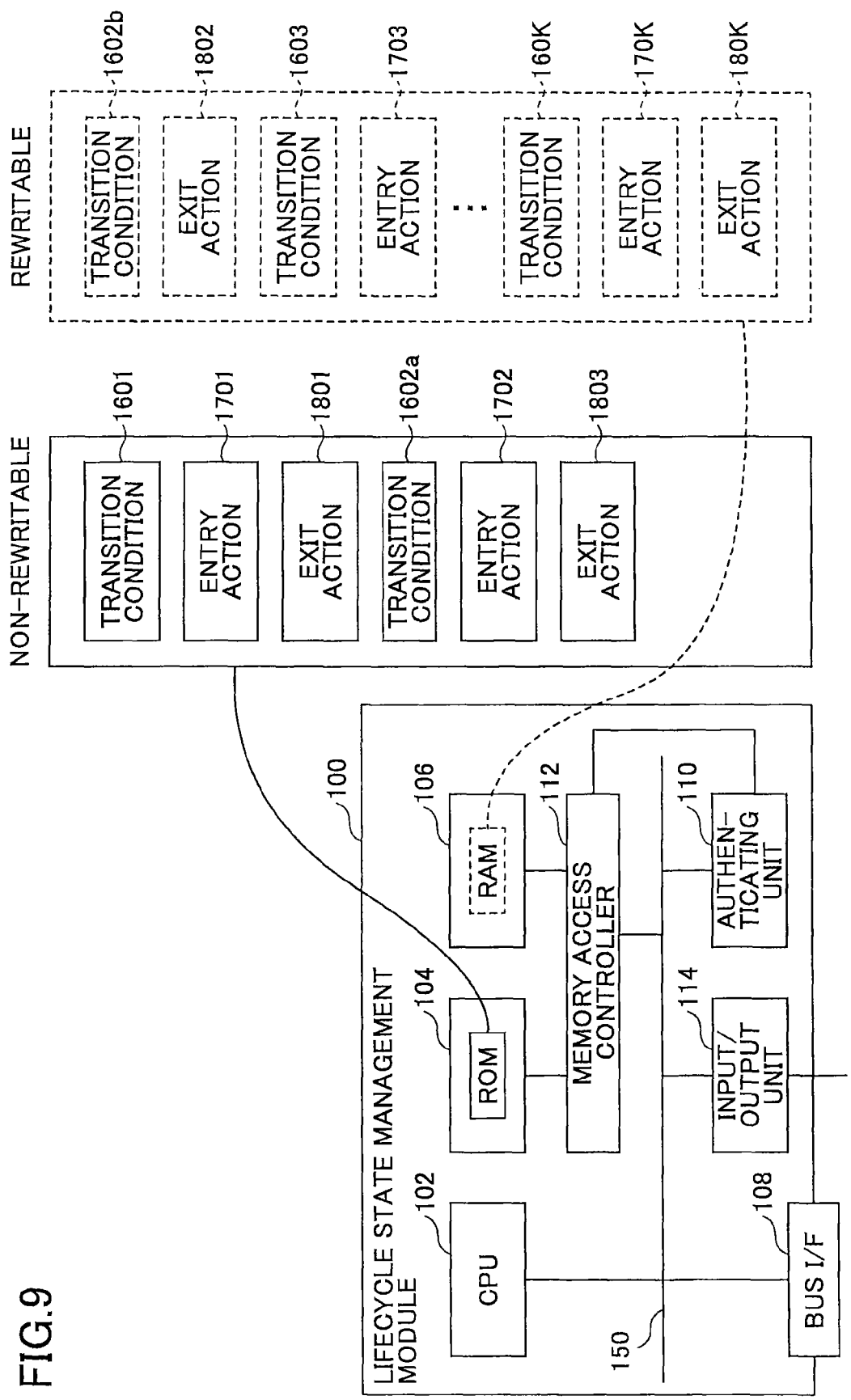
FIG. 9 is another illustration diagram of controlling the storage areas to edit the state data.

FIG. 8 is an illustration diagram of controlling the storage areas in one or both of the ROM 104 and the RAM 106 to edit the state data. FIG. 9 is another illustration diagram of controlling the storage areas in one or both of the ROM 104 and the RAM 106 to edit the state data. FIG. 8 shows an example of the state data in an initial stage such as the production stage 1. The state data 1501-150K are stored in one or both of the ROM 104 and the RAM 106 of the lifecycle state management module 100. The state data 1501, the transition condition 1602a and the entry action 1702 of the state data 1502, and the exit action 1803 of the state data 1503 are non-rewritable data. Meanwhile, the transition condition 1602b and the exit action 1802 of the state data 1502, transition condition 1603 and the entry action 1703 of the state data 1503 and the state data 150K are rewritable data. The memory access controller 112 respectively defines the access authorities for the transition conditions 1601-160K, entry actions 1701-170K, and the exit actions 1801-180K of the state data 1501-150K.

FIG. 9 shows the data stored in the ROM 104 and the RAM 106 of the lifecycle state management module 100. Non-rewritable data such as the state data 1501 (the transition condition 1601, entry action 1701, and exit action 1801), the transition condition 1602a and the entry action 1702 of the state data 1502 and the exit action 1803 of the state data 1503 are stored in ROM 104 of the lifecycle state management module 100. In a case where data is added in the ROM 104, the data cannot be updated by the processes performed by the respective control modules.

Also, rewritable data such as the transition condition 1602b and the exit action 1802 of the state data 1502, the transition condition 1603 and the entry action 1703 of the state data 1503, and the state data 150K (the transition condition 160K, the entry action 170K, and the exit action 180K) are stored in the RAM 106 of the lifecycle state management module 100. In a case where data is added in the RAM 106, the data can be updated (edited) to be added, to be deleted, to be corrected or the like, by the processes performed by the respective control modules.

<Operation from Access Authentication to Writing State Data>

Figure 10:
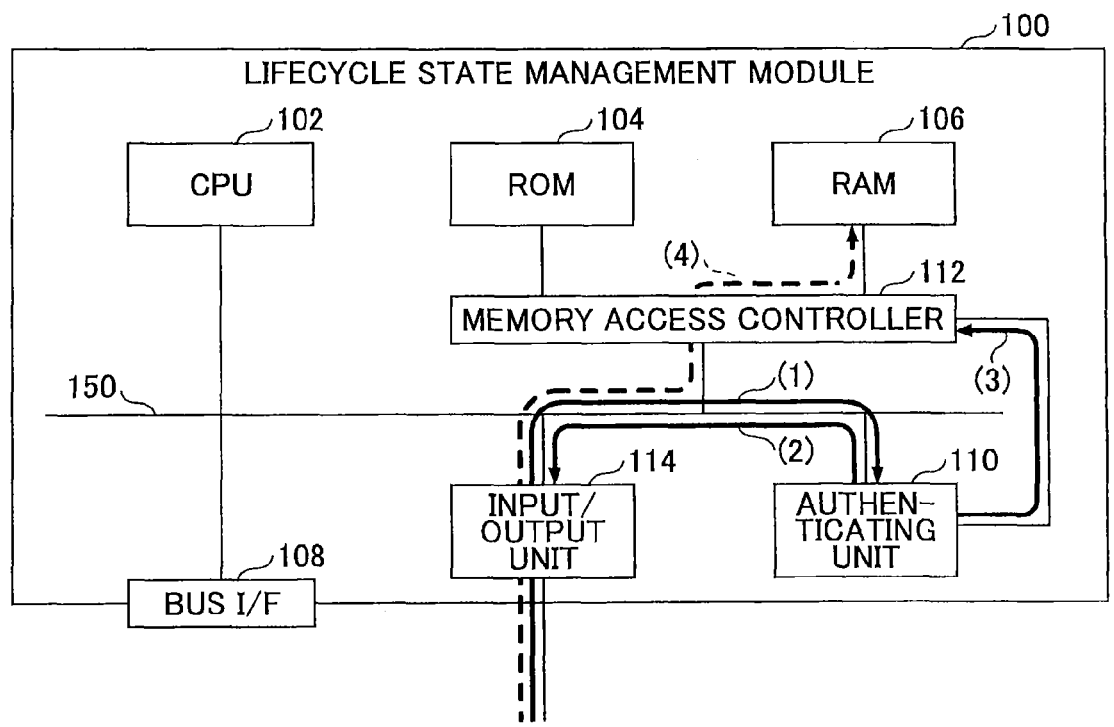
FIG. 10 is a diagram for illustrating a process of an operation from authenticating an access entity to writing the state data by a memory access controller.

FIG. 10 is a diagram for illustrating a process of an operation from authenticating the access entity to writing the state data by the memory access controller 112.

The arrowed line (1) indicates that a user of the apparatus (accessing entity) sends the authentication information from the input/output unit 114 to the authenticating unit 110.

The arrowed line (2) indicates that the authenticating unit 110 checks the authentication information sent from the input/output unit 114 against the authentication information stored in the ROM 104. In a case where the authentication information (access ID and password) matches with the user data, the authenticating unit 110 allows the input/output unit 114 to permit the accessing entity to access to the memory access controller 112. Meanwhile, in a case where the authentication information does not match with the user data, the authenticating unit 110 does not perform further processing. That is, even if the authentication information does not match with the user data, the accessing entity is not notified that the authentication information does not match with the user data, so as to protect the data from a malicious accessing entity. Thus, it appears to the accessing entity as if the access to the memory access controller 112 was successful although the data stored in the ROM 104 and the RAM 106 is not really edited, thereby preventing another access attempt to access by the malicious accessing entity.

The arrowed line (3) indicates that the authenticating unit 110 informs the memory access controller 112 the role of the accessing entity and that access is permitted in a case where the access of the accessing entity is permitted through the user authentication. Thus, the memory access controller 112 indicates an accessible area for the accessing entity.

The arrowed line (4) indicates that the accessing entity starts to transmit the data from the input/output unit 114 to the memory access controller 112 to update the state data. The memory access controller 112 stores the data transmitted from the input/output unit 114 in the ROM 104 or the RAM 106. How the data is distributed from the input/output unit 114 to the ROM 104 and to the RAM 106 by the memory access controller 112 will be described below.

The data stored in the ROM 104 can be updated only by the data transmitted from the input/output unit 114, and cannot be updated by the data transmitted from the bus I/F 108. However, the data stored in the RAM 106 can be updated by the data transmitted from the input/output unit 114 and by the data transmitted from the bus I/F 108.

Figure 11:
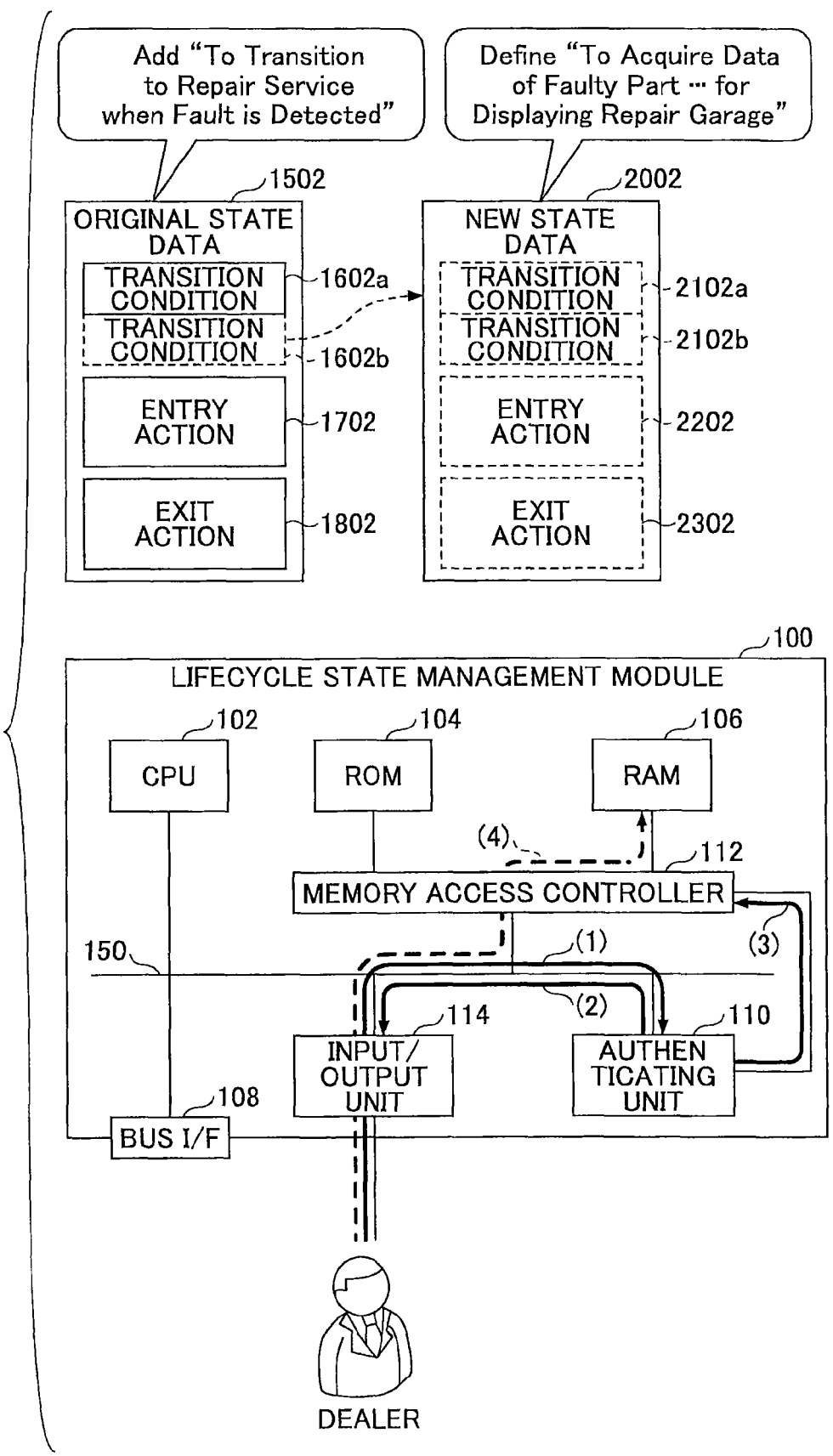
FIG. 11 is an illustration diagram for showing a process where a dealer adds new state data in order to provide customers with a new service.

FIG. 11 is an illustration diagram for showing a process where a dealer adds a new state data in order to provide customers with a new service.

The dealer adds the new state data in order to provide customers with the new service such as a repair service. A condition "to transit to the repair service when a fault is detected" is added as the transition condition 1602*b* of the state data 1502, where the state data 1502 is currently used in the apparatus. The condition is added in a manner as described with reference to FIG. 10.

In FIG. 11, the arrowed line (1) indicates that the dealer, as an accessing entity, transmits the authentication information to the authenticating unit 110 by using the input/output unit 114.

The arrowed line (2) indicates that the authenticating unit 110 performs user authentication for determining whether the dealer is a qualified dealer or not by checking the authentication information transmitted from the input/output unit 114 against the user data stored in the ROM 104. In a case where the authentication information matches with the user data, the authenticating unit 110 outputs an allowance signal for allowing the input/output unit 114 to permit the accessing entity access to the memory access controller 112. When receiving the allowance signal, the input/output unit 114 is ready to transmit the data input by the accessing entity to the memory access controller 112. Meanwhile, in a case where the authentication information does not match with the user data, the authenticating unit 110 does not perform further processing.

The arrowed line (3) indicates that the authenticating unit 110 informs the memory access controller 112 the role of the accessing entity and that access is permitted in a case where the access of the accessing entity is permitted through the user authentication. Thus, the memory access controller 112 indicates an accessible area for the accessing entity according to the role of the accessing entity.

The arrowed line (4) indicates that the input/output unit 114 starts to transmit the data to the memory access controller 112 to update the state data. The transmitted data is the transition condition 1602*b* of the state data 1502 and the state data 2002. In the transition condition 1602*b*, the condition "to transit state data to the repair service when it meets the condition of fault" is described. In this case the state data of the repair service is the state data 2002 which is newly added. In the new state data 2002, an action "to acquire data of faulty part to send parts information of the faulty part to the navigation module 400 for displaying a repair garage" is described as the entry action 2202.

The memory access controller 112 stores the state data 2002 transmitted from the input/output unit 114 in the RAM 106.

Thus, the process is added, by which a transition to the state data 2002 is performed when it meets the condition of fault, and the data of the faulty part is acquired to send parts information of the faulty part to the navigation module 400 for displaying a repair garage.

<Process of Memory Access Controller 112 after Authenticating Accessing Entity>

Figure 12:
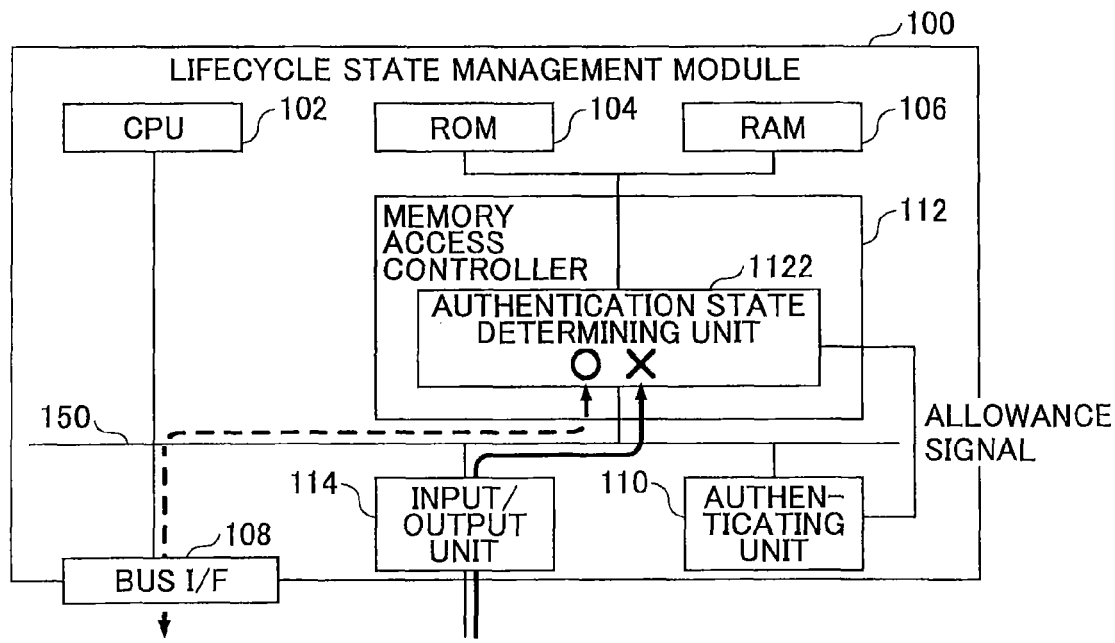
FIG. 12 is an illustration diagram of a process of the memory access controller after authenticating the accessing entity by the authenticating unit.

FIG. 12 is an illustration diagram of a process of the memory access controller 112 after authenticating the accessing entity by the authenticating unit 110.

The memory access controller 112 includes an authentication state determining unit 1122. In a case where the authentication information of the accessing entity matches with the user data, the authenticating unit 110 outputs a control signal such as the allowance signal for allowing the input/output unit 114 to permit the accessing entity access to the memory access controller 112, and a control signal such as an allowance signal for allowing the authentication state determining unit 1122 to permit the accessing entity access to one or both of the ROM 104 and the RAM 106. The authentication state determining unit 1122 determines whether the transmitted data is input through the bus I/F 108 or input through the input/output unit 114. Whether the transmitted data is input through the bus I/F 108 or input through the input/output unit 114 is determined by using an ID dependent on a bus protocol such as AMBA (Advanced Microcontroller Bus Architecture). Or, data indicating whether the transmitted data is input through the bus I/F 108 or input through the input/output unit 114 may be included in the transmitted data. In this case, bus protocols other than the aforementioned protocol may be used.

In a case where the transmitted data is input through the bus I/F 108, the authentication state determining unit 1122 permits access to the ROM 104 and the RAM 106. The data input and transmitted through the bus I/F 108 is presumed to have been verified since it already exists in the apparatus. In a case where the transmitted data is input through the input/output unit 114 and verified by the authenticating unit 110, and the allowance signal for permitting the access to the ROM 104 or the RAM 106 is received; the authentication state determining unit 1122 permits the access to the ROM 104 and the RAM 106. Meanwhile, in a case where the transmitted data is input through the input/output unit 114 and not verified by the authenticating unit 110, and the allowance signal for permitting the access to the ROM 104 or the RAM 106 is not received; the authentication state determining unit 1122 does not permit the access to the ROM 104 and the RAM 106.

Figure 13:
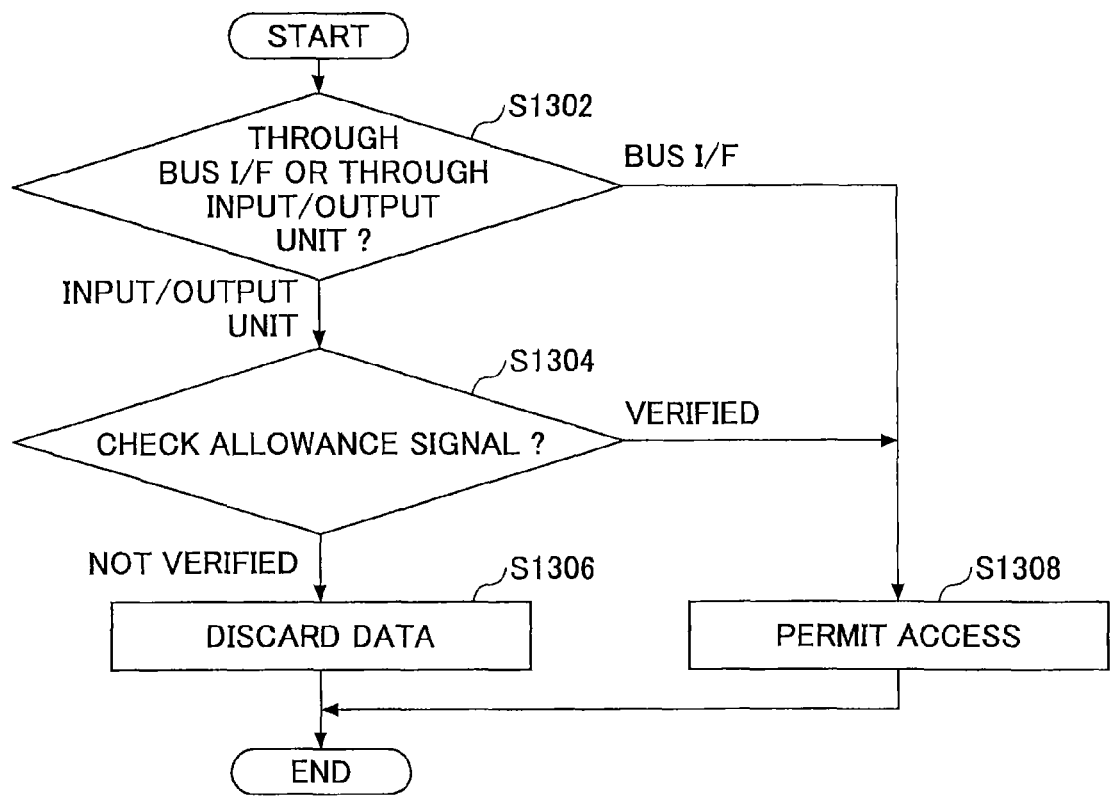
FIG. 13 is a flowchart for illustrating a process performed by the memory access controller.

FIG. 13 is a flowchart for illustrating a process performed by the memory access controller 112. FIG. 13 mainly shows an example of a process performed by the authentication state determining unit 1122.

In step S1302, the authentication state determining unit 1122 determines whether the access is through the bus I/F 108 or through the input/output unit 114.

In step S1304, in a case where it is determined that the access is through the input/output unit 114, the authentication state determining unit 1122 checks the allowance signal from the authenticating unit 110, thereby determining whether it is verified or not.

In step S1306, when the access is determined as not being verified, the authentication state determining unit 1122 discards the data transmitted by the access through the input/output unit 114.

In step S1308, in a case where it is determined, in step S1302, that the access is through the bus I/F 108, or determined, in step S1304, that the access is verified; the authentication state determining unit 1122 permits access to the ROM 104 and the RAM 106. When access to the ROM 104 and the RAM 106 is permitted, the data input through the bus I/F 108 or the input/output unit 114 is stored in the ROM 104 and the RAM 106.

However, in order to be stored in the ROM 104, the data has to be input through the input/output unit 114.

FIG. 14 is an illustration diagram of an example of data transmitted from the input/output unit 114 to the memory access controller 112. Also, in FIG. 14, information added to the transmitted data is shown.

The accessing entity who is verified by the authenticating unit 110 inputs the data by using the input/output unit 114. Identification information to identify the original state data among the state data stored in the ROM 104 or the RAM 106, to which is the new state data is added, and identification information to identify the new state data are added to the input data. In FIG. 14, the original state data 1502 is associated with the new state data 2002.

Information indicating the state data 1502 to which the new state data is added at the head of the data transmitted from the input/output unit 114. Next, the transition condition for transitioning to the new state data 2002 is added. In FIG. 14, "to transition to state data 2002 when it meets the condition of fault" is added as the transition condition. Next, identification information (for example, a number (No.)) of the state data 2002 or the like for indicating the state data 2002 is added, and also a name of the state data 2002 is added. In FIG. 14, "Repair Service" is added as the name of the state data 2002. Next, the transition condition of the transition from the new state data 2002 is added. In FIG. 14, "to return to the state data 1502 when the repair is completed" is added as the transition condition of the transition from the new state data 2002. Next, an access control of the transition condition is added. In FIG. 14, the access control of the transition condition is "Read Only", which causes the transition condition to be stored in the ROM 104.

Next, an entry action of the new state data is added to the transmitted data. In FIG. 14, "to acquire data of the faulted control module" is added as the entry action of the new state data. Next, the access control of the entry action is added. In FIG. 14, the access control of the entry action is "Read/Write", which causes the entry action to be stored in the RAM 106.

Next, an exit action of the new state data is added. In FIG. 14, "to notify the user of repair completion" is added as the exit action of the new state data. Next, the access control of the exit action is added. In FIG. 14, the access control of the exit action is "Read/Write", which causes the exit action to be stored in the RAM 106. The data described above is transmitted in a certain data format such as the text data format.

Thus, the verified user can change the types or details of the stage 2 corresponding to the state data 1502 so that the process of the repair service (state data 2002) is performed in stage 2. The new state data 2002 is associated with the original state data 1502, whereas the new state data 2002 is state data to which a transition from the original data 1502 is performed and from which a transition back to the original state data 1502 is performed. That is to say, the new state data 2002 becomes child data of the original data 1502 (parent data). Therefore, according to the present embodiment, it is possible to change the types or details of the stage corresponding to the original state data by adding the new state data so as to operate the control modules to perform a specific process necessary at a specific destination (location).

The arrangement of the information added to the transmitted data shown in FIG. 14 is not a limiting example, and the information may be arranged in a different manner within a data structure readable by the memory access controller 112. Also, an error detection code such as a checksum may be added to secure the integrity of the data.

FIG. 15 is an illustration diagram for showing an example of an arrangement of the state data in the ROM 104 and the RAM 106. FIG. 15 shows a specific arrangement of the transition condition, entry action and exit action of the state data.

The memory access controller 112 distributes the data transmitted from the input/output unit 114 to the ROM 104 or the RAM 106 according to the access control. The memory access controller 112 stores the data transmitted from the input/output unit 114 in the ROM 104 in a case where the "Read Only" is set as the access control, while storing it in the RAM 106 in a case where the "Read/Write" is set as the access control.

For example, in FIG. 15, the original state data 1502 from the production stage 1 of the lifecycle to which the new state data is added, is stored in the ROM 104 as non-rewritable data, and the newly added transition condition of the state data 1502, the new state data 2002 and the name of the new state data 2002 are also stored in the ROM 104. Thus, the state data 1502 cannot be rewritten. However, the original state data 1502, the newly added transition condition of the state data 1502, the new state data 2002 and the name of the new state data 2002 can be stored in the RAM 106. In this case, the data can be rewritten.

That is, the transition condition of the state data and the like stored in the ROM 104 cannot be rewritten without an operation through the input/output unit 114 and verified by the authenticating unit 110. Meanwhile the transition condition of the state data and the like stored in the RAM 106 can be rewritten without an operation through the input/output unit 114. For example, the transition condition of the state data and the like stored in the RAM 106 can be rewritten by the processes performed by the respective control modules, where the data for rewriting the transition condition and the like of the state data is transmitted through the bus I/F 108.

The transition condition, the entry action and the exit action of the new state data 2002 includes identification information (for example, a number (No.)) of the state data 2002, thereby being associated with the state data 2002 so as to enable the memory access controller 112 access to them if needed.

The memory access controller 112 retrieves the access control of the transition data of the state data 2002 from the data shown in FIG. 14 to determine that the "Read Only" is set, then, stores the transition condition of the state data 2002 in the ROM 104. Also, the memory access controller 112 retrieves the access control of the entry action of the state data 2002 from the data shown in FIG. 14 to determine that "Read/Write" is set, then, stores the entry action of the state data 2002 in the RAM 106. Further, the memory access controller 112 retrieves the access control of the exit action of the state data 2002 from the data shown in FIG. 14 to determine that "Read/Write" is set, then, stores the exit action of the state data 2002 in the RAM 106.

The arrangement of the data in the ROM 104 and the RAM 106 shown in FIG. 15 is an example, and the data may be arranged in a different manner within a data structure readable by the memory access controller 112. Also, an error detection code such as a checksum may be added to secure the integrity of the data.

Figure 16:
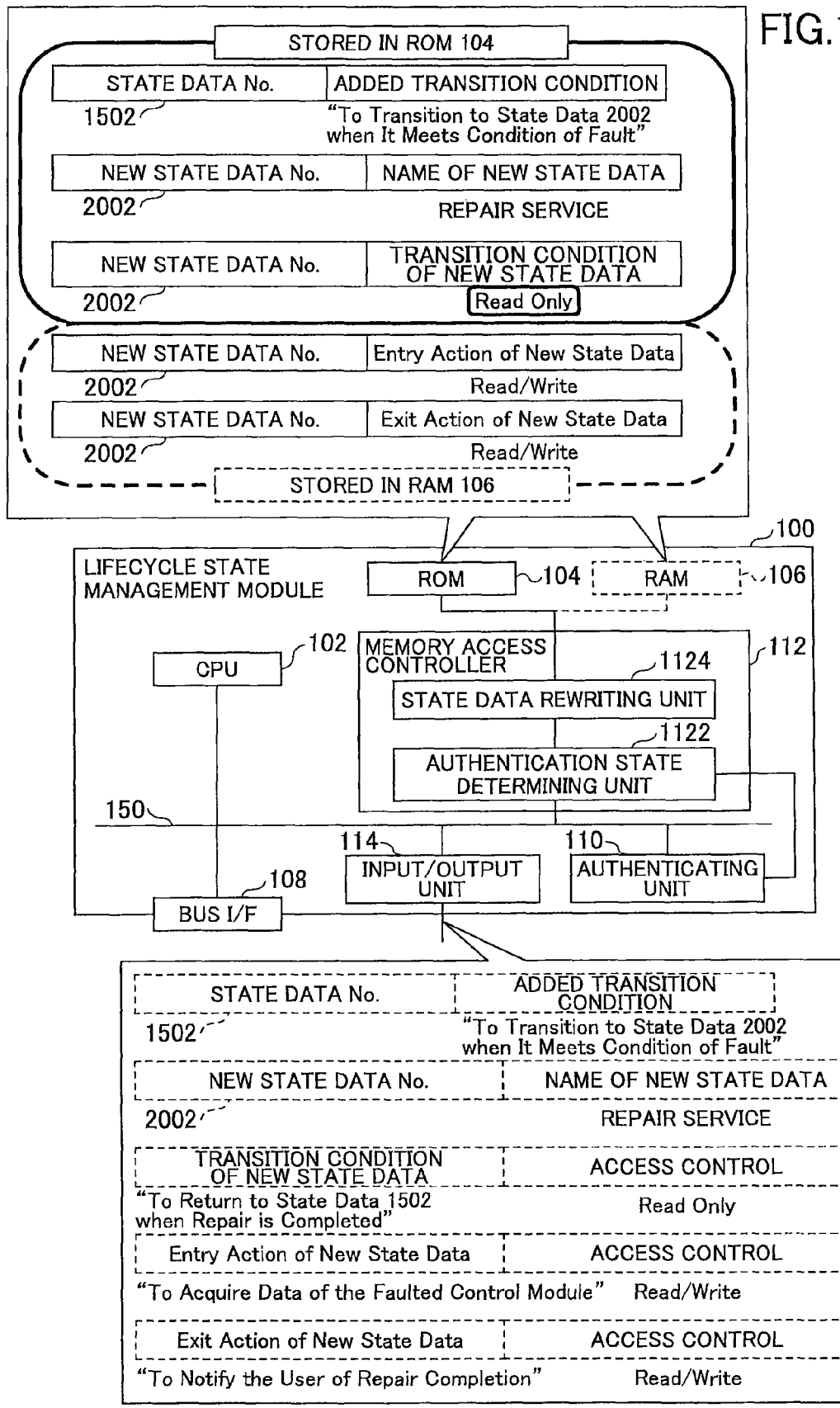
FIG. 16 is a diagram for illustrating an example of a process of the memory access controller.

FIG. 16 is a diagram for illustrating an example of a process of the memory access controller 112 for distributing the data transmitted from the input/output unit 114 to the ROM 104 or the RAM 106.

The memory access controller 112 includes a state data rewriting unit 1124 for determining the access controls, or the like of the data transmitted from the input/output unit 114, thereby storing the data in an arrangement shown in FIG. 15.

Figure 17:
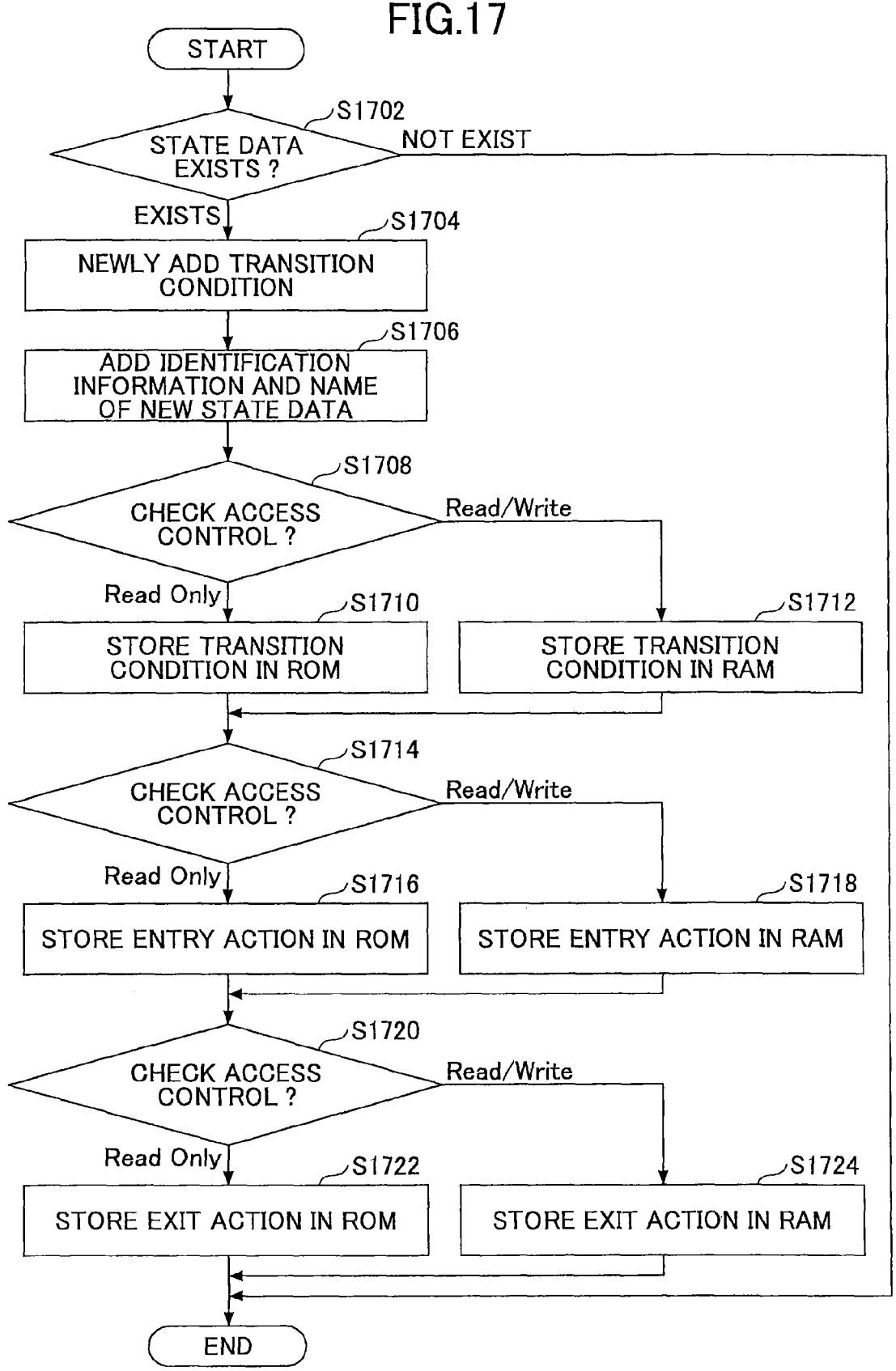
FIG. 17 is a flowchart for illustrating an example process of the state data rewriting unit.

FIG. 17 is a flowchart for illustrating an example process of the state data rewriting unit 1124 of the memory access controller 112.

In step S1702, the state data rewriting unit 1124 determines whether the state data 1502 which is to be edited with the data transmitted from the input/output unit 114, exists in the ROM 104 or the RAM 106.

In step S1704, in a case where the state data 1502 exists in the ROM 104 or the RAM 106, the state data rewriting unit 1124 stores the state data 1502 and the newly added transition condition of the state data 1502 in the ROM 104. For example, "to transit to state data of the repair service when it meets the condition of fault" is stored as the newly added transition condition of the state data 1502.

In step S1706, the state data rewriting unit 1124 stores the identification information (for example a number) of the new state data and the name of the new state data in the ROM 104. For example, "2002", as the identification information of the new state data, and "repair service", as the name of the new state data, are stored. In this example, although the newly added transition condition and the name of the new state data are stored in the ROM 104 since they are not expected to be changed, they may be stored in the RAM 106 so as to be changed.

In step S1708, the state data rewriting unit 1124 checks the access control of the transition condition of the new state data.

In step S1710, in a case where "Read Only" is set as the access control of the transition condition of the new state data, the state data rewriting unit 1124 stores the transition condition of the new state data with the identification information of the new state data in the ROM 104. In FIG. 16, the state data rewriting unit 1124 stores the transition condition ("to return to the state data 1502 when the repair is completed") of the new state data with the identification information ("2002") of the new state data in the ROM 104 since "Read Only" is set as the access control of the transition condition of the new state data.

In step S1712, in a case where "Read/Write" is set as the access control of the transition condition of the new state data, the state data rewriting unit 1124 stores the transition condition of the new state data with the identification information of the new state data in the RAM 106.

In step S1714, the state data rewriting unit 1124 checks the access control of the entry action of the new state data.

In step S1716, in a case where "Read Only" is set as the access control of the entry action of the new state data, the state data rewriting unit 1124 stores the entry action of the new state data with the identification information of the new state data in the ROM 104.

In step S1718, in a case where "Read/Write" is set as the access control of the entry action of the new state data, the state data rewriting unit 1124 stores the entry action of the new state data with the identification information of the new state data in the RAM 106. In FIG. 16, the state data rewriting unit 1124 stores the entry action ("to acquire data of the faulted control module") of the new state data with the identification information ("2002") of the new state data in the RAM 106 since "Read/Write" is set as the access control of the entry action of the new state data.

In step S1720, the state data rewriting unit 1124 checks the access control of the exit action of the new state data.

In step S1722, in a case where "Read Only" is set as the access control of the exit action of the new state data, the state data rewriting unit 1124 stores the exit action of the new state data with the identification information of the new state data in the ROM 104.

In step S1724, in a case where "Read/Write" is set as the access control of the exit action of the new state data, the state data rewriting unit 1124 stores the exit action of the new state data with the identification information of the new state data in the RAM 106. In FIG. 16, the state data rewriting unit 1124 stores the exit action ("to notify the user of repair completion") of the new state data with the identification information ("2002") of the new state data in the RAM 106 since "Read/Write" is set as the access control of the exit action of the new state data.

Additionally, if the timing at which the stage of the lifecycle transitions to the next stage is coincident with the timing at which the state data is edited, the state data may be updated in the current stage or may be updated in the next stage according to the role of the accessing entity. In a case where the state data is updated in the current stage, the transition of the stage is suspended until the edit is completed.

Also, a device which can handle a plurality of authentication requests may be disposed so that the state data of the plurality of the vehicles having the same destination can be edited at once, by sending the authentication requests from the device to the vehicles. Thus, the state data can be quickly edited.

According to the present embodiment, the state data installed in the production stage of the lifecycle can be edited in later stages by an authenticated user. Programming for the respective destination is not required when editing the state data to program a new state of the apparatus, thereby reducing the design cost of the control modules included in the apparatus and the manufacturing cost thereof.

<Variation (1)>

A variation (1) of the lifecycle state management module 100 can be described with reference to FIG. 12. In the variation (1) of the lifecycle state management module 100, the user authentication has a valid period. The authentication state determining unit 1122 of the memory access controller 112 has a timer. The authentication state determining unit 1122 activates the timer when receiving the allowance signal for accessing the ROM 104 or the RAM 106 from the authenticating unit 110.

The authentication state determining unit 1122 controls access permission to the ROM 104 or the RAM 106 until a predetermined time from the activation of the timer passes, while the authentication state determining unit 1122 controls access denial to the ROM 104 or the RAM 106 after passing the predetermined time. Specifically, a threshold of the timer is set in advance, and the authentication state determining unit 1122 compares the value of the timer with the threshold. When the value of the timer is less than or equal to the threshold, the authentication state determining unit 1122 controls access permission to the ROM 104 or the RAM 106, however when the value of the timer is greater than the threshold, the authentication state determining unit 1122 controls access denial to the ROM 104 or the RAM 106. The authentication state determining unit 1122 notifies the authenticating unit 110 that access to the ROM 104 or the RAM 106 is denied when it controls access denial to the ROM 104 or the RAM 106 since the value of the timer becomes greater than the threshold. The authenticating unit 110 requests the accessing entity a new user authentication in response to the notification that access to the ROM 104 or the RAM 106 is denied. Thus, data security will be improved in a case where an accessing entity is permitted to access the memory access controller 112 and thereafter another person tries to input the data using the permission, however the access to the ROM 104 or the RAM 106 is denied upon passing the predetermined period.

Figure 18:
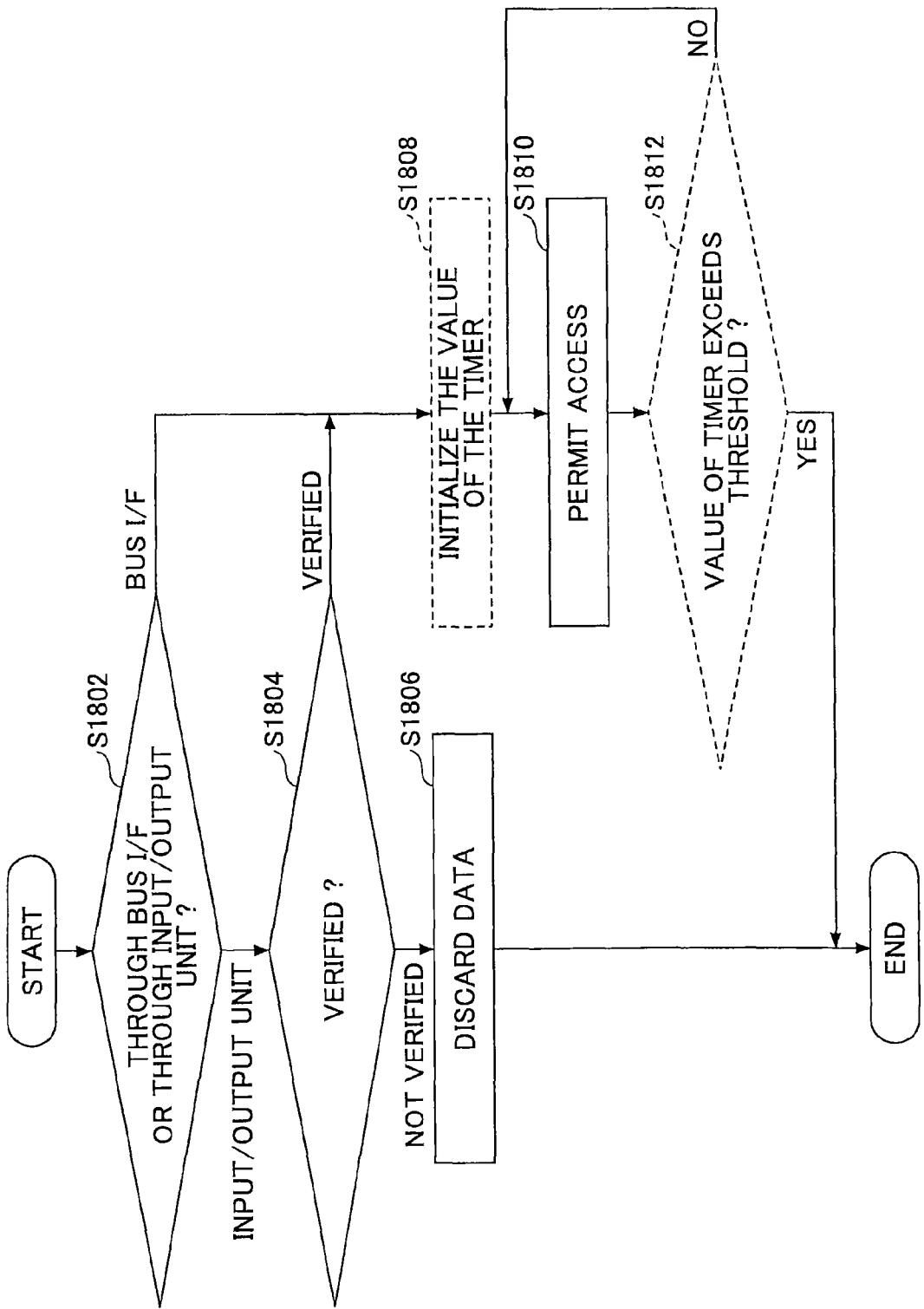
FIG. 18 is a flowchart for illustrating a process of the memory access controller.

FIG. 18 is a flowchart for illustrating a process of the memory access controller 112. In FIG. 18, an example process of the authentication state determining unit 1122 is mainly illustrated. Also, additional processes added to the processes of FIG. 13 are shown with dashed lines.

In step S1802, the authentication state determining unit 1122 determines whether the access is through the bus I/F 108 or through the input/output unit 114.

In step S1804, in a case where it is determined that the access is through the input/output unit 114, the authentication state determining unit 1122 checks the allowance signal from the authenticating unit 110, thereby determining whether it is verified or not.

In step S1806, when the access is determined as not being verified, the authentication state determining unit 1122 discards the data transmitted by the access through the input/output unit 114.

In step S1808, in a case where it is determined (in step S1802), that the access is through the bus I/F 108, or determined (in step S1804), that the access is verified, the authentication state determining unit 1122 initializes the value of the timer.

In step S1810, the authentication state determining unit 1122 permits the access to the ROM 104 and the RAM 106. When the access to the ROM 104 and the RAM 106 is permitted, the data input through the bus I/F 108 or the input/output unit 114 is stored in the ROM 104 and the RAM 106.

In step S1812, the authentication state determining unit 1122 determines whether the value of the timer exceeds the threshold or not. In a case where the value of the timer exceeds the threshold, the process shown in FIG. 18 is terminated. Meanwhile, in a case where the value of the timer does not exceed the threshold, the process returns to step S1810.

<Variation (2)>

Figure 19:
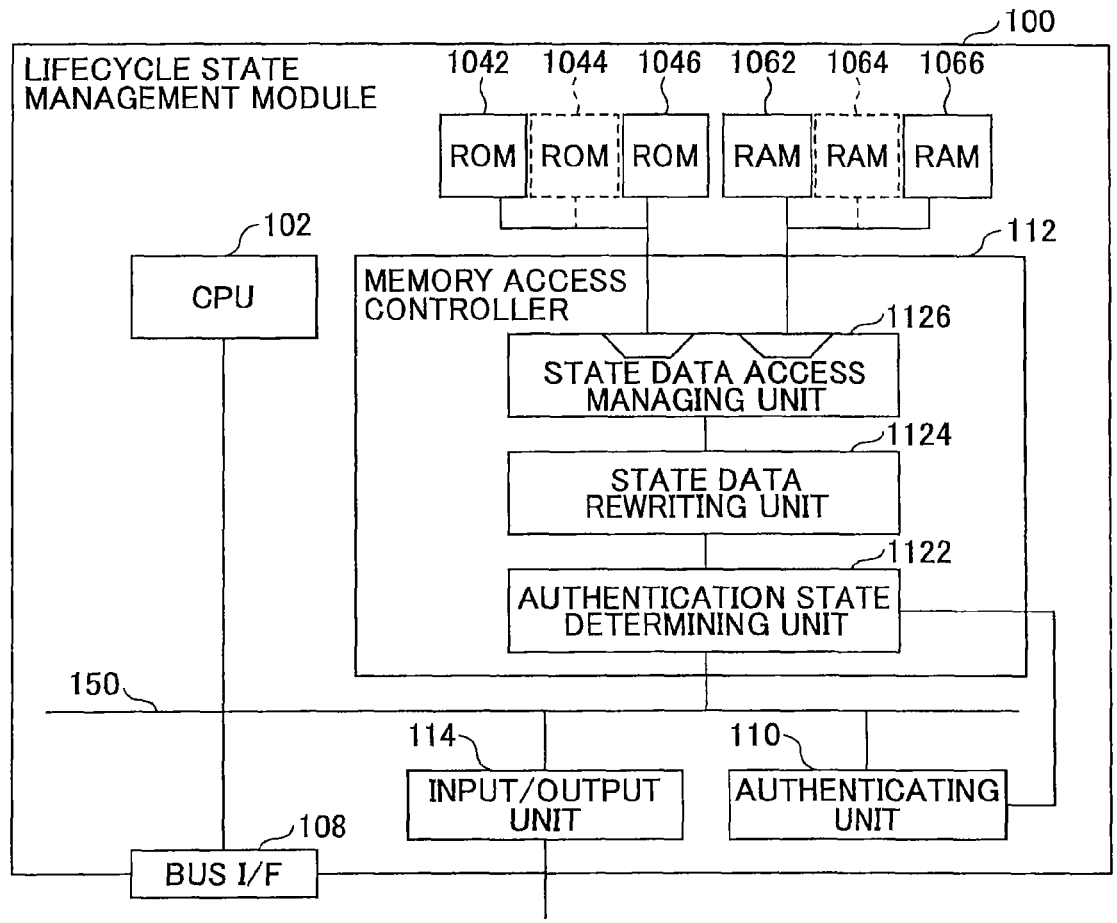
FIG. 19 is an illustration diagram of a variation of the lifecycle state management module.

FIG. 19 is an illustration diagram of a variation (2) of the lifecycle state management module 100. In the variation (2) of the lifecycle state management module 100, areas in the ROM 104 and the RAM 106 accessible by the memory access controller 112 are divided into a plurality of blocks, whereas the memory access controller designates accessible areas on a block basis. In the lifecycle state management module 100 shown in FIG. 19, the ROM 104 (shown in FIG. 16) is divided into blocks in which the respective blocks are shown as a ROM 1042, a ROM 1044, and a ROM 1046. Also, the RAM 106 (shown in FIG. 16) is divided into blocks in which the respective blocks are shown as a RAM 1062, a RAM 1064, and a RAM 1066. Further, in FIG. 19, a state data access managing unit 1126 is included in the memory access controller 112. Here, the number of blocks respectively included in the ROM 104 or the RAM 106 is not limited to three, and may be two, or four or more. Further, the number of blocks included in the ROM 104 may be different from that in the RAM 106.

The state data access managing unit 1126, referring to the state data, switches (to designate) the blocks in the ROM 104 and the RAM 106 accessible by the memory access controller 112 when it meets the transition condition of the state data. Therefore, the blocks that are not designated by the state data access managing unit 1126 become inaccessible by the memory access controller, thereby preventing it from editing the data stored in those blocks in order to improve data security.

Figure 20:
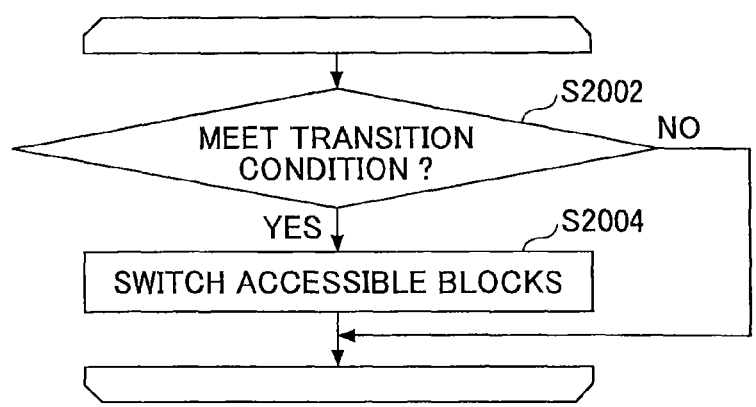
FIG. 20 is a flow chart for illustrating an example of a variation of the operation of the memory access controller.

FIG. 20 is a flow chart for illustrating an example of a variation of the operation of the memory access controller 112. FIG. 20 mainly shows an operation of the state data access managing unit 1126.

In step S2002, the state data access managing unit 1126 determines whether it meets the transition condition of the state data. In a case where it does not meet the transition condition of the state data, the process shown in FIG. 20 is terminated.

In step S2004, in a case where it meets the transition condition of the state data, the state data access managing unit 1126 switches (to designate) the blocks in the ROM 104 and the RAM 106 accessible by the memory access controller 112.

Figure 21:
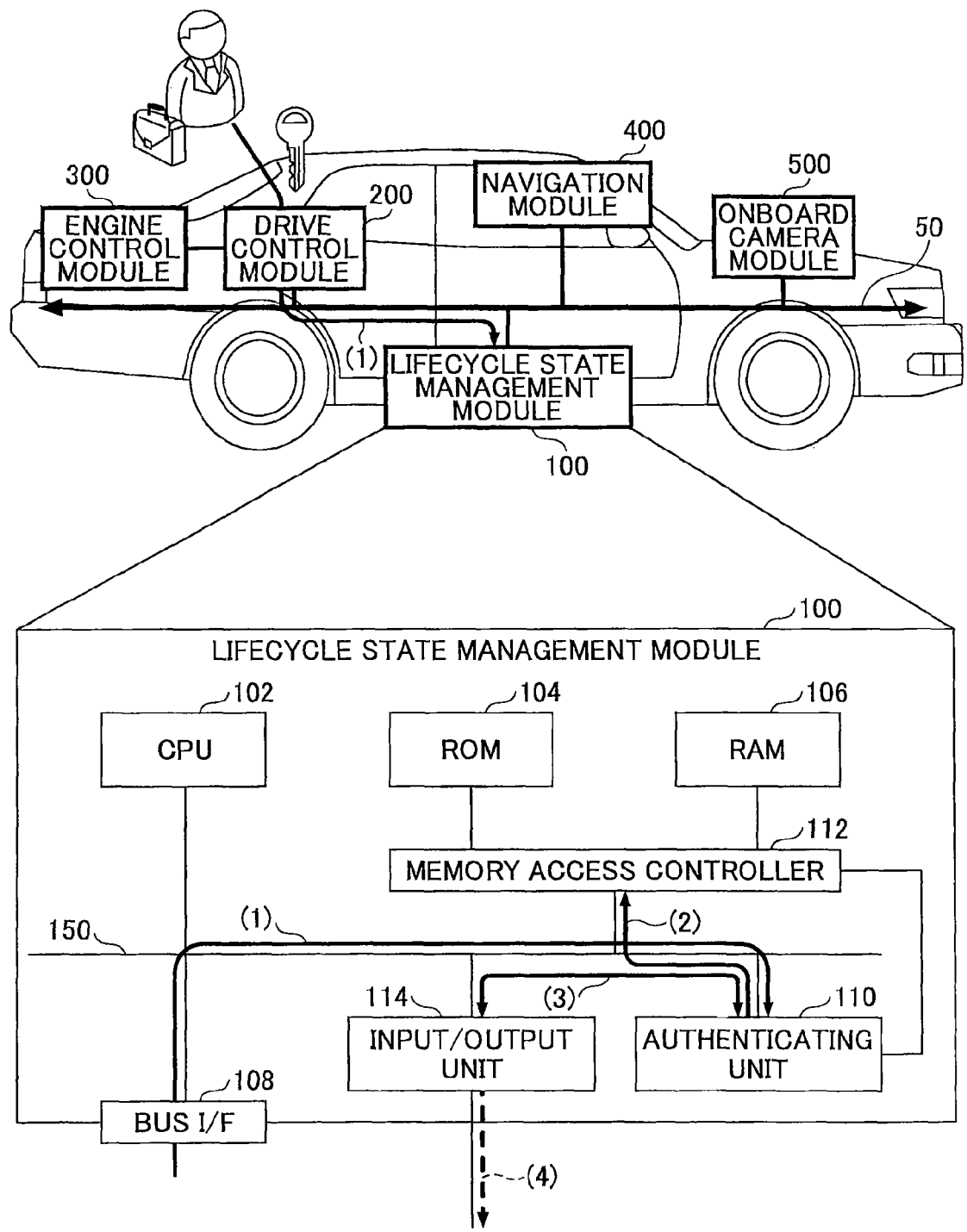
FIG. 21 is an illustration diagram of an example application of the lifecycle state management module.

FIG. 21 is an illustration diagram of an example application of the lifecycle state management module 100. In FIG. 21, a malicious user tries to start the engine of the vehicle by using a key.

The arrowed line (1) indicates that when the engine is started using a key having a fingerprint authentication function, fingerprint data is input from the drive control module 200 to authenticating unit 110 through the bus I/F 108 of the lifecycle state management module 100. Here, the key having a fingerprint authentication function is an example, and an electronic key system may be used. For example, key data may be sent from a smartphone to the authenticating unit 110 through the input/output unit 114.

The arrowed line (2) indicates that the authenticating unit 110 accesses the memory access controller 112 to reference to the state data and the user data 1001-100N. Further, the authenticating unit 110 determines whether the input fingerprint data matches the user data of the vehicle owner. For example, "to transition to vehicle theft service when the input fingerprint data does not match the user data of the vehicle owner" is described as the transition condition in the state data, and "to contact the owner and the police" is described as the entry action. In a case where the input fingerprint data does not match with the user data of the vehicle owner, the authenticating unit 110 controls the transition to the state data of the vehicle theft service since it meets the transition condition in the state data.

The arrowed line (3) indicates that after transitioning to the state data of the vehicle theft service, the authenticating unit 110 outputs data to the input/output unit 114 indicating the transition to the vehicle theft service, in accordance with the "to contact the owner and the police" defined as the entry action of the state data of the vehicle theft service.

The arrowed line (4) indicates that the input/output unit 114 outputs information indicating the transition to the vehicle theft service by using an electronic mail, or the like to an external network. Here, the electronic mail is an example, and other means for transmission may be used.

For example, specifically, in a case where an unqualified used car dealer sends the key data to the input/output unit 114, the authenticating unit 110 determines that the key data does not match with the user data. Thus, for example, a notification or an alarm can be sent to the qualified dealer according to the description of the entry action of the state data.

<Functional Configuration of Drive Control Module 200>

Figure 22:
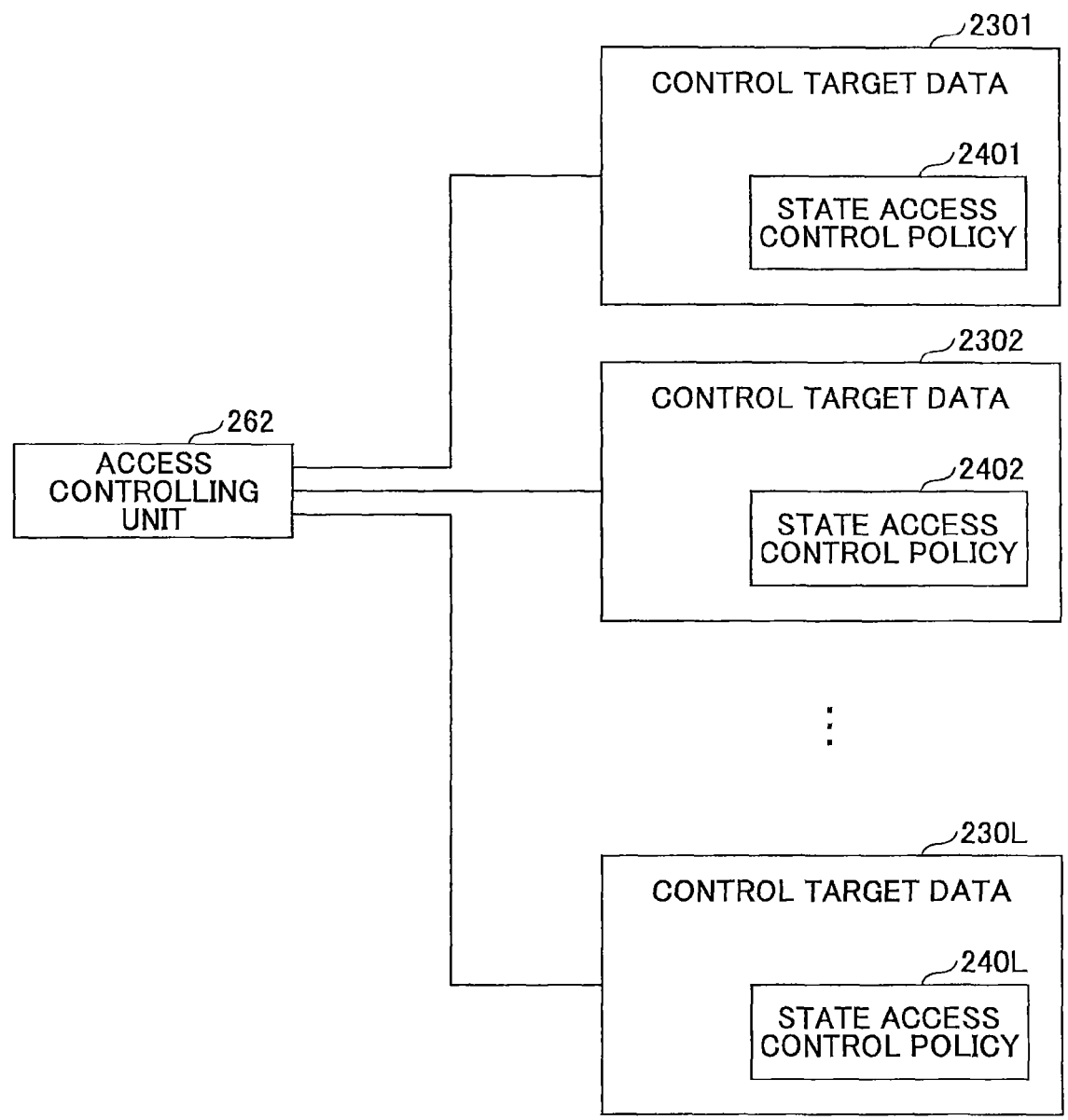
FIG. 22 is a block diagram for illustrating a functional configuration of the drive control module.

In the following a functional configuration of the control module (drive control module 200) will be described. FIG. 22 is a block diagram for illustrating a functional configuration of the drive control module 200 included in the apparatus of the present embodiment. Additionally, the hardware configuration of the drive control module 200 is shown in FIG. 4. In FIG. 22, data stored in one or both of the ROM 204 and the RAM 206 is described as well as the respective functional blocks of the drive control module 200.

The drive control module 200 includes an access controlling unit 262. The access controlling unit 262 is a function or means achieved by operation of any element or unit shown in FIG. 4 in accordance with instructions of the CPU 202 according to an access control program that is a program for the drive control module that is retrieved from the ROM 204 to be loaded into the RAM 206.

That is, the access controlling unit 262 is a function or a means achieved by operation of any element or unit shown in FIG. 4 in accordance with instructions of the CPU 202 according to the access control program that is retrieved from the ROM 204 to be loaded into the RAM 206.

(Functional Configuration of Drive Control Module 200)

In the following, with reference to FIG. 4 and FIG. 22, the functions in the drive control module 200 are described in detail. Additionally, in the following, relations with elements or units important to achieve the respective functions of the drive control module 200 among the elements of units shown in FIG. 4 are also described in order to describe the respective functions of the drive control module 200.

The access controlling unit 262 in the drive control module 200 shown in FIG. 22 is achieved by instructions of the CPU 202 shown in FIG. 4, and the control target data 2301-230L (wherein L is a positive integer) stored in the ROM 204. Further, the state access control policies 2401-240L with respect to the respective control target data 2301-230L are stored in the ROM 204. Here, the control target data 2301-230L may be associated with the respective control modules installed in the vehicle such as the engine control module 300, the navigation module 400 and the onboard camera module 500. That is, the respective control modules include the control target data.

The access controlling unit 262 determines whether the accessing entity is allowed to access the control target data 2301-230L or not, in a certain lifecycle state. The control target data 2301-230L respectively includes the state access control policies 2401-240L. The state access control policies 2401-240L include the respective users and the roles allowed to access the control target data, in a certain lifecycle state. The access controlling unit 262 determines whether the accessing entity has access authority to the control target data or not by referring to the state access control policies 2401-240L.

Specifically, the access controlling unit 262 requests, through the bus I/F 208, the lifecycle state management module 100 to notify the state (stage) of the lifecycle and the role of the accessing entity. The access controlling unit 262 receives, through the bus I/F 208, the state (stage) of the lifecycle and the role of the accessing entity sent from the lifecycle state management module 100. The access controlling unit 262 identifies, by referring to the state access control policies 2401-240L in the control target data 2301-230L, the role (or roles) allowed to access in the state (stage) of the lifecycle acquired from the lifecycle state management module 100, and thereby determines the accessibility of the accessing entity by determining whether the role of the accessing entity is found in the identified roles or not.

<Process of Changing State of Lifecycle>

Figure 23:
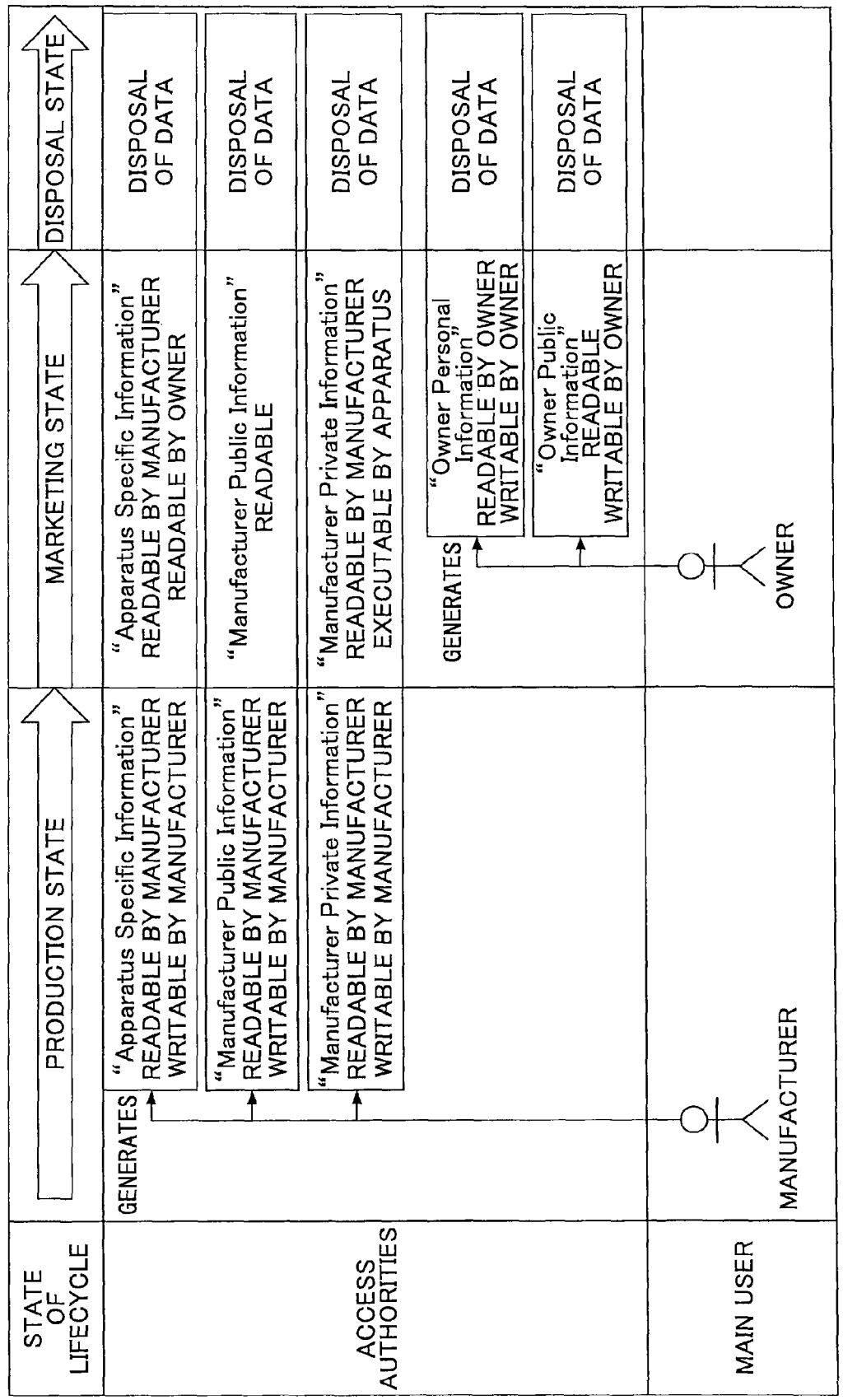
FIG. 23 is a diagram for illustrating a process of changing a state (stage) of the lifecycle.

FIG. 23 is a diagram for illustrating a process of changing the state (stage) of the lifecycle. In FIG. 23, the three stages of the lifecycle of the apparatus are exemplified as a production state, a marketing state, and a disposal state. The stages of the lifecycle are changed in the sequence described above, and the access authorities of the respective control target data and persons allowed to access the control target data are also changed according to the changed stages of the lifecycle. The stages of the lifecycle shown in FIG. 23 is not a limiting example, and other stages may be included in the lifecycle. For example, a recycle state, where the state of the apparatus is prepared to return from the marketing state to the production state, may be included in the lifecycle.

The production state is a stage before transitioning to the marketing state, where various settings necessary for the apparatus are done. In FIG. 23, a manufacturer can generate and store "Apparatus Specific Information" for identifying the apparatus itself, and "Manufacturer Public Information" and "Manufacturer Private Information" for authenticating the manufacturer. In the production state, the "Apparatus Specific Information", the "Manufacturer Public Information" and the "Manufacturer Private Information" are set to be readable and writable by the manufacturer.

When it is ready to transition from the production state to the marketing state, transitioning to the marketing state is performed. In FIG. 23, according to the transition from the production state to the marketing state, a main user is also changed from the manufacturer to an owner, therefore the access to the data in the drive control module is managed based on the authentication information set by the owner. The owner can generate and store "Owner Personal Information" as personal information of the owner, and "Owner Public Information" as public information of the owner. In the marketing state, the "Owner Personal Information" and the "Owner Public Information" are set to be readable and writable by the owner. Further, the "Owner Public Information" is set to be readable by a person other than the owner.

In the marketing state, the "Owner Personal Information" cannot be read by the manufacturer, therefore the owner's personal information can be secured even if the manufacturer is not trustworthy. Meanwhile, the "Manufacturer Private Information" cannot be read by the owner, therefore the private information of the manufacturer can be secured even if the owner is not trustworthy.

Also, in the marketing state, the "Apparatus Specific Information" is set to be readable by the manufacturer and the owner, the "Manufacturer Public Information" is set to be readable by every accessing entity, and the "Manufacturer Private Information" is set to be readable by the manufacturer. Further, the "Manufacturer Private Information" can be executed by the apparatus. That is, in the marketing state, "Manufacturer Private Information" cannot be rewritten, thereby preventing the manufacturer's repudiation.

When it is ready to transition from the marketing state to the disposal state, transitioning to the disposal state is performed. In FIG. 23, all the data is set to be deleted as the entry action of the transition from the marketing state to the disposal state in the lifecycle. Thus, the theft of private information or personal information after disposal of the apparatus is prevented. For example, the data stored in the apparatus is overwritten with new data to delete the data for the prevention of theft of private information or personal information after disposal.

Thus, there is not a failure to delete data since all the data is managed in accordance with the stages of the lifecycle, whereas, there may be a failure to delete data when the data of the apparatus is separately managed. Also, access authority for the respective data is also changed in accordance with the stages of the lifecycle, therefore only appropriate persons can access the data in the respective stages of the lifecycle since errors in changing access authority are unlikely to occur.

<State Access Control Policy>

FIG. 24 is a diagram for showing an example of the state access control policies 1401-140M included in the control target data 1301-130M of the lifecycle state management module 100. FIG. 24 can be also applied to the state access control policies 2401-240L included in the control target data 2301-230L of the drive control module 200, the engine control module 300, the navigation module 400 and the onboard camera module 500.

The control target data 1301-130M, which are managed by the lifecycle state management module 100, respectively include the state access control policies 1401-140M. An example of the state access control policies 1401-140M are shown in a matrix format where the access authority is associated with the role of the accessing entity and the stage of the lifecycle.

However, the identification information (ID) of the accessing entity may be used instead of the role of the accessing entity. In this case, the accessing entity is associated with an individual access authority, for example, a unique access authority can be given to a particular accessing entity. Specifically, a powerful (higher level) access authority may be given to the particular accessing entity. Meanwhile, when an access authority is associated with a role of the accessing entity, a group of accessing entities that have the same role may have the same access authority. Thus, the access authority can be managed by group.

In the following a detailed description will be given.

An example of types of access authorities to be assigned to the roles of the accessing entities and explanation thereof are shown below.

(1) "Read"; capable of reading the control target data
(2) "Write"; capable of writing (generating) the control target data
(3) "Exec"; capable of executing the control target data.
(4) "Delete"; capable of deleting the control target data
(5) "Rewrite"; capable of changing (rewriting) the control target data The respective state access control policies are created for the respective control target data.

In FIG. 24, the manufacturer, an administrator, and the owner are exemplified as the roles of the accessing entities, and the production state, the marketing state, and the disposal state are exemplified as the stages of the lifecycle. Further, private (personal) information and public information of the respective roles of the accessing entities are exemplified as the control target data.

In FIG. 24, (1) the state access control policy of the private information of the manufacturer, (2) the state access control policy of the private information of the administrator, (3) the state access control policy of the private information of the owner are shown. Also, in FIG. 24, (4) the state access control policy of the public information of the manufacturer, (5) the state access control policy of the public information of the administrator, (6) the state access control policy of the public information of the owner are shown.

As shown in FIG. 24, the information belonging to the manufacturer are the "Manufacturer Private Information" and the "Manufacturer Public Information" which are corresponding to (1) and (4) in FIG. 24. The manufacturer can generate the "Manufacturer Private Information" and the "Manufacturer Public Information" in the production state and install them in the apparatus.

In the following, the "Manufacturer Private Information" will be described.

In the production state, the manufacturer can read ("Read"), write ("Write"), execute ("Exec"), and rewrite ("Rewrite") the "Manufacturer Private Information", while the administrator and the owner can execute ("Exec") the "Manufacturer Private Information".

After transitioning from the production state to the marketing state, the lifecycle state management module 100 performs the access control so that the manufacturer cannot write ("Write") or rewrite ("Rewrite") the "Manufacturer Private Information". Thus, the manufacturer cannot change the content of the "Manufacturer Private Information" after transitioning to the marketing state. Therefore, the manufacturer cannot repudiate responsibility for the processes using the "Manufacturer Private Information".

In the marketing state, the administrator and the owner can execute ("Exec") the "Manufacturer Private Information".

When it is ready to transit from the marketing state to the disposal state, transitioning to the disposal state is performed. The lifecycle state management module 100 performs the access control so that the manufacturer cannot read ("Read") and execute ("Exec") the "Manufacturer Private Information" while the manufacturer can delete ("Delete") the "Manufacturer Private Information". The manufacturer can delete the "Manufacturer Private Information" to discard it. Thus, the theft of the "Manufacturer Private Information" stored in the apparatus, after disposing of the apparatus, can be prevented. Further, in view of security, the lifecycle state management module 100 performs access control so that the administrator can delete ("Delete") the "Manufacturer Private Information" in the disposal state.

In the following, the "Manufacturer Public Information" will be described.

In the production state, the manufacturer can read ("Read"), write ("Write"), execute ("Exec"), and rewrite ("Rewrite") the "Manufacturer Public Information", while the administrator and the owner can read ("Read") and execute ("Exec") the "Manufacturer Public Information".

After transitioning from the production state to the marketing state, the lifecycle state management module 100 performs the access control so that the manufacturer cannot write ("Write") or rewrite ("Rewrite") the "Manufacturer Public Information". Thus, the manufacturer cannot change the content of the "Manufacturer Public Information" after transitioning to the marketing state. Therefore, the manufacturer cannot repudiate the responsibility for the processes using the "Manufacturer Public Information".

In the marketing state, the administrator and the owner can read ("Read"), and execute ("Exec") the "Manufacturer Public Information".

When it is ready to transition from the marketing state to the disposal state, transitioning to the disposal state is performed. The lifecycle state management module 100 performs access control so that the manufacturer cannot read ("Read") and execute ("Exec") the "Manufacturer Public Information" while the manufacturer can delete ("Delete") the "Manufacturer Public Information". The manufacturer can delete the "Manufacturer Public Information" to discard it. Thus, the theft of the "Manufacturer Public Information" stored in the apparatus, after disposing of the apparatus, can be prevented. Further, in view of security, the lifecycle state management module 100 performs access control so that the administrator can delete ("Delete") the "Manufacturer Public Information" in the disposal state.

As shown in FIG. 24, the information belonging to the administrator are the "Administrator Private Information" and the "Administrator Public Information" which are corresponding to (2) and (5) in FIG. 24. The administrator can generate the "Administrator Private Information" and the "Administrator Public Information" in the marketing state and install them in the apparatus.

In the following, the "Administrator Private Information" will be described.

In the marketing state, the administrator can read ("Read"), write ("Write"), and execute ("Exec") the "Administrator Private Information", while the manufacturer and the owner can execute ("Exec") the "Administrator Private Information". Thus, the "Administrator Private Information" can be protected from the accessing entities whose roles are not the administrator, thereby improving the data security in the lifecycle state management module 100.

When it is ready to transition from the marketing state to the disposal state, transitioning to the disposal state is performed. The lifecycle state management module 100 performs access control so that the administrator cannot read ("Read"), write (Write), and execute ("Exec") the "Administrator Private Information" while the administrator can delete ("Delete") the "Administrator Private Information". The administrator can delete the "Administrator Private Information" to discard it. Thus, the theft of the "Administrator Private Information" stored in the apparatus, after disposing of the apparatus, can be prevented. Further, in view of security, the lifecycle state management module 100 performs access control so that the manufacturer can delete ("Delete") the "Administrator Private Information" in the disposal state.

In the following the "Administrator Public Information" will be described.

In the marketing state, the administrator can read ("Read"), write ("Write"), and execute ("Exec") the "Administrator Public Information", while the manufacturer and the owner can read ("Read"), and execute ("Exec") the "Administrator Public Information".

When it is ready to transition from the marketing state to the disposal state, transitioning to the disposal state is performed. The lifecycle state management module 100 performs the access control so that the administrator cannot read ("Read"), write (Write), and execute ("Exec") the "Administrator Public Information" while the administrator can delete ("Delete") the "Administrator Public Information". The administrator can delete the "Administrator Public Information" to discard it. Thus, the theft of the "Administrator Public Information" stored in the apparatus, after disposing of the apparatus, can be prevented. Further, in view of security, the lifecycle state management module 100 performs access control so that the manufacturer can delete ("Delete") the "Administrator Public Information" in the disposal state.

As shown in FIG. 24, the information belonging to the owner are the "Owner Private Information (Owner Personal Information)" and the "Owner Public Information" which are corresponding to (3) and (6) in FIG. 24. The owner can generate the "Owner Private Information" and the "Owner Public Information" in the marketing state and install them in the apparatus.

In the following, the "Owner Private Information" will be described.

In the marketing state, the owner and the administrator can read ("Read"), write ("Write"), and execute ("Exec") the "Owner Private Information", while the manufacturer can execute ("Exec") the "Owner Private Information". Thus, the "Owner Private Information" can be protected from the accessing entities whose roles are not either the owner or the administrator, thereby improving the data security in the lifecycle state management module 100.

Additionally, the access authority of the administrator may be set in a different manner. For example, it may be set so that the administrator can read ("Read") and write ("Write") the "Owner Private Information" to give a powerful (higher level) access authority to the administrator. Meanwhile, it may be set so that the administrator cannot read ("Read") and write ("Write") the "Owner Private Information" to give a weak (lower level) access authority to the administrator.

When it is ready to transition from the marketing state to the disposal state, transitioning to the disposal state is performed. The lifecycle state management module 100 performs the access control so that the owner and the administrator cannot read ("Read"), write (Write), and execute ("Exec") the "Owner Private Information" while the owner and the administrator can delete ("Delete") the "Owner Private Information". The owner and the administrator can delete the "Owner Private Information" to discard it. Thus, the theft of the "Owner Private Information" stored in the apparatus, after disposing of the apparatus, can be prevented. Further, in view of security, the lifecycle state management module 100 performs access control so that the manufacturer can delete ("Delete") the "Owner Private Information" in the disposal state.

In the following, the "Owner Public Information" will be described.

In the marketing state, the owner and the administrator can read ("Read"), write ("Write"), and execute ("Exec") the "Owner Public Information", while the manufacturer can execute ("Exec") the "Owner Public Information".

Additionally, the access authority of the administrator may be set in a different manner. For example, it may be set so that the administrator can write ("Write") the "Owner Public Information" to give a powerful (higher level) access authority to the administrator. Meanwhile, it may be set so that the administrator cannot write ("Write") the "Owner Public Information" to give a weak (lower level) access authority to the administrator.

When it is ready to transition from the marketing state to the disposal state, transitioning to the disposal state is performed. The lifecycle state management module 100 performs access control so that the owner and the administrator cannot read ("Read"), write ("Write"), and execute ("Exec") the "Owner Public Information" while the owner and the administrator can delete ("Delete") the "Owner Public Information". The owner and the administrator can delete the "Owner Public Information" to discard it. Thus, the theft of the "Owner Public Information" stored in the apparatus, after disposing of the apparatus, can be prevented. Further, in view of security, the lifecycle state management module 100 performs the access control so that the manufacturer can delete ("Delete") the "Owner Public Information" in the disposal state.

<Access to Control Target Data>

Figure 25:
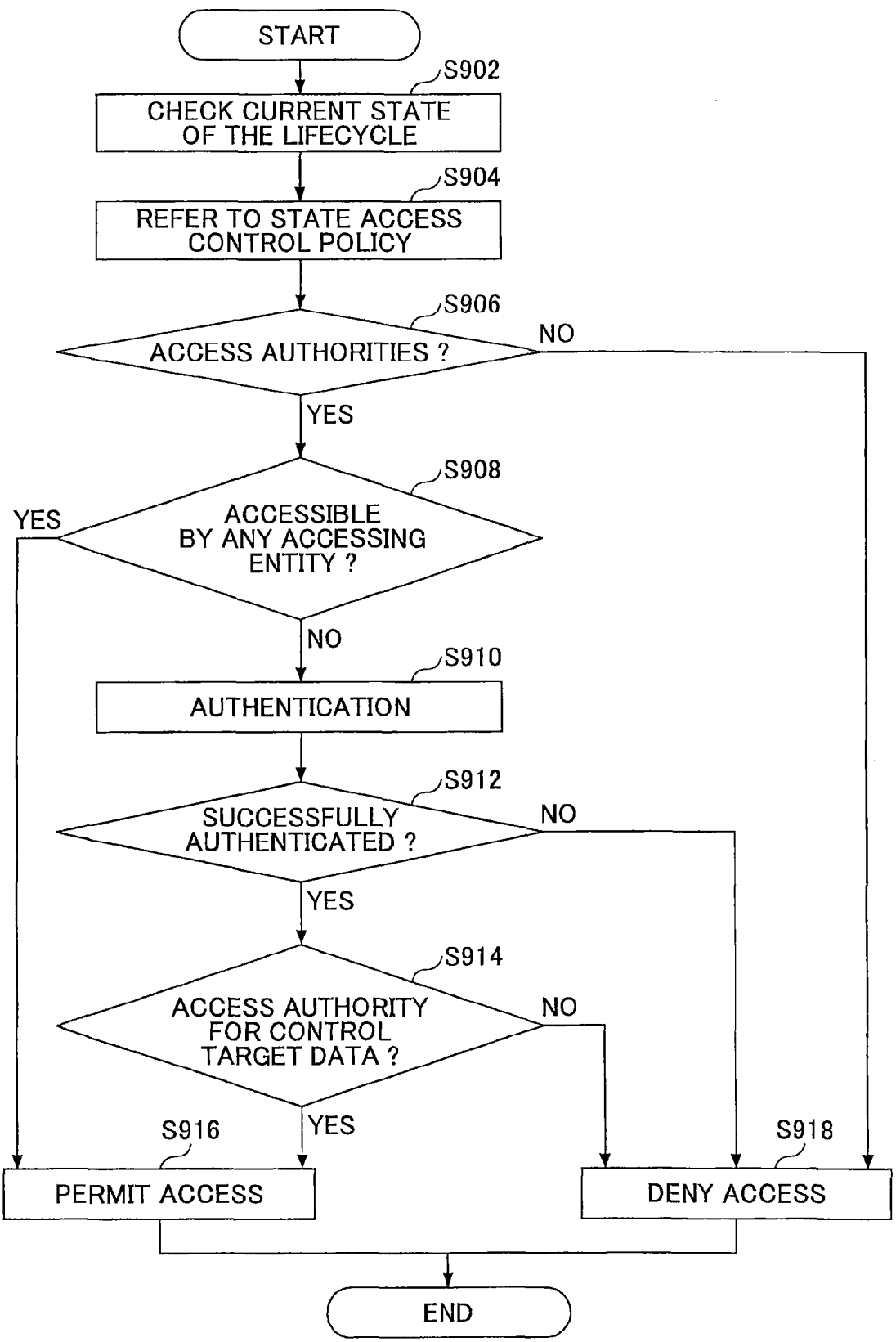
FIG. 25 is a flowchart for illustrating a process of accessing the control target data.

FIG. 25 is a flowchart for illustrating a process of accessing the control target data.

In a case where a request for the access to the control target data is received, the access controlling unit 162 of the lifecycle state management module 100 determines whether it accepts the request the accessing the control target data or denies it. Additionally, since programs are stored in the ROM 104 as the control target data, the request for the access to the control target data is received when the execution of the programs is requested. However, when executing the programs for controlling the data access sequence such as the state management program, or the user authentication program, the request for accessing the control target data is not required and the execution may be performed by any accessing entity.

Here, the accessing entity requests access to the control target data 130M.

In step S902, when receiving the request for access to the control target data 130M, the access controlling unit 162 requests the state managing unit 164 to inform the current state of the lifecycle. The state managing unit 164, with reference to the lifecycle state data 166 in response to the access request from the access controlling unit 162, acquires the lifecycle state information and informs the access controlling unit 162. The access controlling unit 162 can recognize the current state of the lifecycle by receiving the lifecycle state information.

In step S904, the access controlling unit 162 refers to the part corresponding to the current state of the lifecycle in the state access control policy 140M of the control target data 130M.

In step S906, the access controlling unit 162 determines whether the control target data 130M includes information (such as the "Manufacturer Private Information", "Manufacturer Public Information", etc.) whose access authority, indicating it is accessible by a certain role of the current state of the lifecycle, is set in the state access control policy 140M.

In step S908, in a case where the control target data 130M includes information whose access authority of the current state of the lifecycle is set in the state access control policy 140M, the access controlling unit 162 determines whether the control target data 130M is accessible by any accessing entity (for example, in a case where the control target data 130M is data necessary for executing the programs for controlling the data access sequence) or not.

In step S910, when determining, in step S908, that the control target data 130M is not accessible by any accessing entity, the user authenticating unit 160 performs authentication of the accessing entity. That is, when access to the control target data 130M is permitted for a certain role described in the state access control policy 140M, the user authenticating unit 160 performs authentication of the accessing entity. The user authenticating unit 160 requests the accessing entity to input the identification information and the authentication information of the accessing entity for authenticating the accessing entity. The identification information and the authentication information of the accessing entity are input from the bus I/F 108. For example, a password authentication is performed by receiving the user ID and the password of the accessing entity input from an input device connected with the bus I/F 108.

In step S912, the user authenticating unit 160 determines whether the accessing entity is successfully authenticated or not.

In step S914, in a case where the accessing entity is successfully authenticated by the user authenticating unit 160, the user authenticating unit 160 provides the access controlling unit 162 with the role of the accessing entity. The access controlling unit 162 determines, based on the role of the accessing entity, whether the accessing entity has access authority for accessing the control target data 130M or not. The access controlling unit 162 finds the roles which are allowed access in the state of the lifecycle informed by the state managing unit 164, and determines whether the role of the accessing entity is included in the found roles or not to determine whether the accessing entity is allowed access.

In step S916, when the accessing entity is determined, in step S914, to be allowed to access, or the control target data 130M is determined, in step S908, to be accessible by any accessing entity, the access controlling unit 162 permits the accessing entity to access the control target data 130M.

In step S918, when it is determined, in step S906, that the control target data 130M does not include information whose access authority, indicating it is accessible by a certain role of the current state of the lifecycle is set in the state access control policy 140M, the access controlling unit 162 denies the access of the accessing entity before performing authentication of the accessing entity.

Also, in step S918, when the accessing entity is not successfully authenticated by the user authenticating unit 160 in step S912, the user authenticating unit 160 provides the access controlling unit 162 with the authentication result indicating an authentication failure. When receiving the authentication result indicating on authentication failure from the user authenticating unit 160, the access controlling unit 162 denies the accessing entity access to the control target data 130M.

Also, in step S918, when it is determined that the accessing entity does not have access authority for accessing the control target data 130M, the access controlling unit 162 denies the accessing entity access to the control target data 130M.

The steps described in the flowchart shown in FIG. 25 may not be performed in the described order. For example, step S910 may be performed before step S902.

Also, a part of the processes shown in FIG. 25 may be applied to the processes of the drive control module 200. That is, the lifecycle state management module 100 informs the drive control module 200 of the state of the lifecycle after performing step S902.

The access controlling unit 262 of the drive control module 200 performs steps S904-S908 based on the state of the lifecycle informed by the lifecycle state management module 100. In a case where the control target data is accessible by any accessing entity, the access controlling unit 262 of the drive control module 200 permits the accessing entity to access to the control target data. In a case where the control target data is not accessible by any accessing entity, the access controlling unit 262 of the drive control module 200 notifies it to the lifecycle state management module 100.

When notification is sent that the control target data is not accessible by any accessing entity, the lifecycle state management module 100 performs steps S910-S912. The lifecycle state management module 100 denies the accessing entity access to the control target data in a case where the authentication failed while notifies the authentication success to the drive control module 200 in a case where the accessing entity is successfully authenticated.

When the successful authentication is notified, the access controlling unit 262 determines whether the accessing entity has access authority for accessing the control target data, thereby performing steps S916 or S918.

Also, a part of the processes shown in FIG. 25 may be applied to the processes of the engine control module 300, the navigation module 400, and the onboard camera module 500 similarly to the drive control module 200.

<State Change in Lifecycle>

Figure 26:
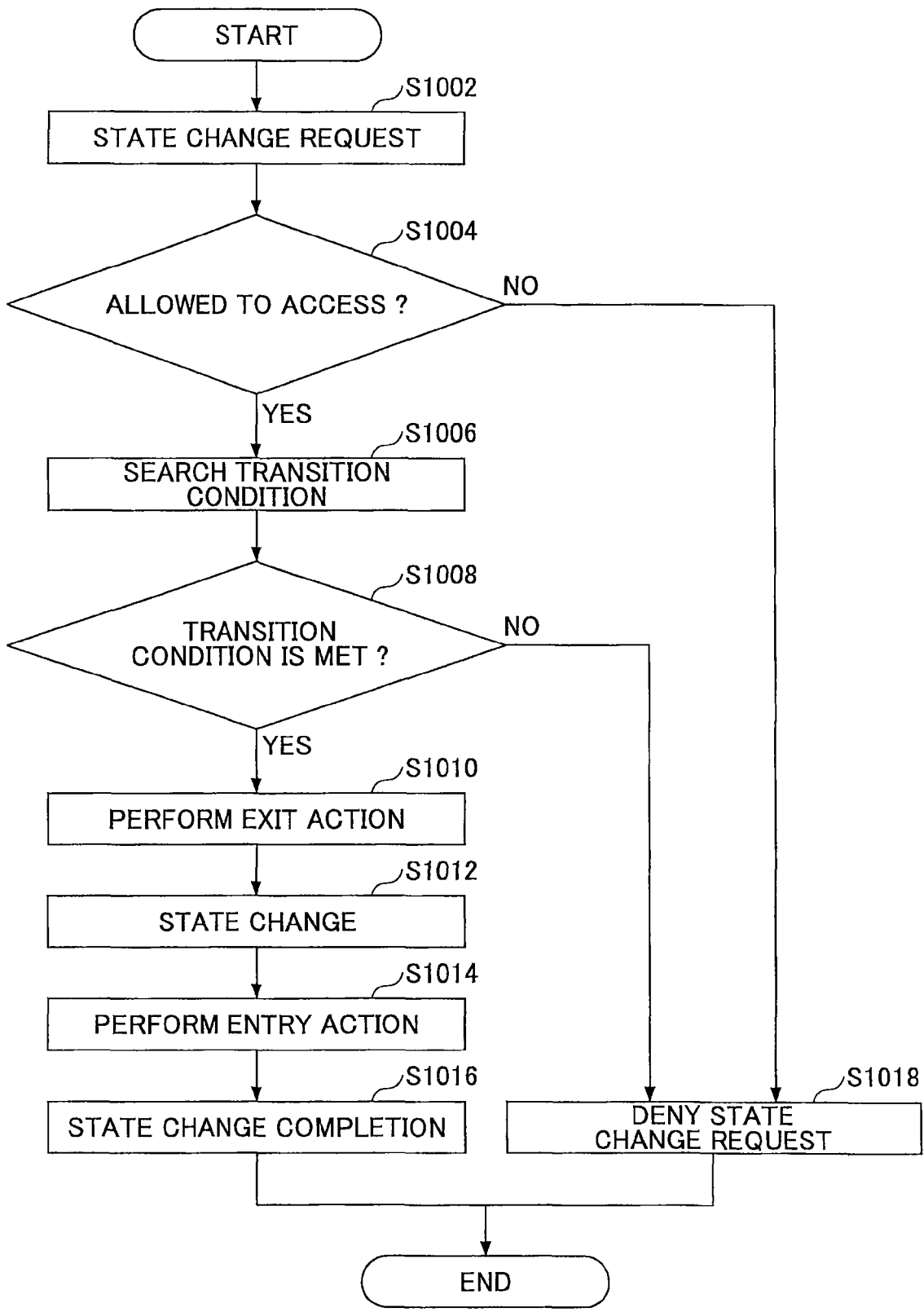
FIG. 26 is a flowchart for illustrating a process of state change in the lifecycle.

FIG. 26 is a flowchart for illustrating a process of state change in the lifecycle.

In step S1002, the access controlling unit 162 of the lifecycle state management module 100 accepts a request for changing the state of the lifecycle (hereinafter referred to as "state change request").

In step S1004, the access controlling unit 162 of the lifecycle state management module 100 determines whether the accessing entity who has sent the state change request is one that is allowed access or not. The access controlling unit 162, having performed access controlling, performs a process to change the state of the lifecycle in response to the state change request. Specifically, the access controlling unit 162 accesses the control target data as shown in FIG. 9. The access controlling unit 162 performs a process to change the state in the lifecycle in a case where access to the control target data is permitted, while denying to perform a process to change the state of the lifecycle in a case where access to the control target data is not permitted.

In step S1006, in a case where the accessing entity, who has sent state change request in step S1004, is one that is allowed access, the state managing unit 164 searches for the transition condition. When accepting the state change request, the access controlling unit 162 requests the state managing unit 164 to inform the transition condition of the state in which the state change request is sent. The state managing unit 164 informs the access controlling unit 162 of the transition condition in response to the request from the access controlling unit 162. The transition condition is such that a certain data exists or that a certain data meets a formal requirement. Here, the transition condition is by comparing the hash values of all the data stored in the ROM 104 and determining no falsified data.

In step S1008, the access controlling unit 162 determines whether the transition condition is met or not with reference to the transition condition informed by the state managing unit 164. Here, the access controlling unit 162 calculates the hash values of all the data stored in the ROM 104 such as control target data 1301-130M, thereby determining if falsified data is present to determine whether the transition condition is met or not.

In step S1010, when no falsified data is confirmed in step S1008, that is, when the transition condition is met, the access controlling unit 162 performs the exit action required for transitioning to the next state. In a case where the transition condition is met, the access controlling unit 162 requests the state managing unit 164 to inform the exit action required for transitioning to the next state. The state managing unit 164 informs the exit action required for transiting to the next state in response to the request from the access controlling unit 162. The access controlling unit 162 performs the process in accordance with the exit action informed by the state managing unit 164. By performing the exit action, information, which may cause vulnerability of the data security if it remains after transitioning to the next state in the lifecycle, can be deleted or overwritten. An example of the exit action is to delete log data implying (containing) personal information of the main user in the former state of the lifecycle, or to set the data to non-rewritable for preventing the falsification of a private key, or the like.

In step S1012, the access controlling unit 162 performs the process to change the state of the lifecycle, after performing the exit action in step S1010. The access controlling unit 162 informs the state managing unit 164 of the state change. The state managing unit 164, upon being informed of the state change by the access controlling unit 162, changes the current state into the state changed by the process performed by the access controlling unit 162 in step S1012.

In step S1014, an entry action required after changing the state of the lifecycle is performed. The access controlling unit 162 requests the state managing unit 164 to inform the entry action after changing the state of the lifecycle. The state managing unit 164 informs the entry action in response to the request from the access controlling unit 162. The access controlling unit 162 performs processes in accordance with the entry action informed by the state managing unit 164. As the entry action, initialization of security information or the like is performed to maintain the data security after changing the state of the lifecycle. For example, in a case where a communication key is required, a process for automatically generating a communication key is performed as the entry action.

In step S1016, the state change is completed after performing the entry action in step S1014.

In step S1018, in a case where the accessing entity who has sent the state change request is not determined to be one allowed access in step S1004, or the presence of the falsified data is confirmed (the transition condition is not met) in step S1008, the access controlling unit 162 denies the state change request.

The steps described in the flowchart shown in FIG. 26 may not be performed in the described order.

According to the present embodiment, the control of operations of the apparatus or access control to the data in the apparatus are performed based on the states corresponding to the respective stages of the lifecycle, thereby securing safety even if the main user of the apparatus is changed. That is, a consistent security management of the apparatus can be achieved by managing the respective states of the lifecycle throughout the stages from the production to disposal. Also, unauthorized access by former users of the apparatus can be prevented since access control is performed according to the current state and the role of the accessing entities.

Further, since a person who is allowed to access electronic information assets is managed in the entire apparatus storing the electronic information assets, a person who can access the electronic information assets is changed in synchronization with the state change. Also, since an exit action or an entry action can be performed triggering a changing in the state of the lifecycle, electronic information which may lead to security holes can be deleted or reset.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-106775 filed on May 23, 2014, Japanese Priority Application No. 2014-140219 filed on Jul. 8, 2014, and Japanese Priority Application No. 2015-026698 filed on Feb. 13, 2015, the entire contents of which are hereby incorporated herein by reference.

What is claimed is:

1. A management apparatus to control an embedded apparatus within which the management apparatus is embedded, the embedded apparatus including at least one control module separate from the management apparatus, the management apparatus comprising:
    processing circuitry configured to manage a current state of the embedded apparatus and to control the at least one control module based on the current state, wherein the state of the embedded apparatus is changed from one to another among a plurality of lifecycle states over time; and
    a memory to store state data defining processes for controlling the at least one control module in response to a change of the state,
    wherein the processing circuitry is further configured to edit the state data stored in the memory so as to change a process to be performed in a given state among the plurality of states;
    the state data includes respective state data corresponding to each state in the plurality of states, and the processing circuitry controls the at least one control module according to the state data corresponding to the current state; and
    the processing circuitry is further configured to control access to data of the at least one control module by managing authentication information of an accessing entity who requests to access the data of the at least one control module, and associate the accessing entity with a state access control policy set for each of the at least one control module of the embedded apparatus in accordance with the plurality of lifecycle states of the embedded apparatus,
    wherein the processing circuitry is further configured to authenticate a user as an authorized user who has an access authority for editing certain state data, and
    the processing circuitry denies a request for editing when a certain period from a timing at which the user is successfully authorized by the processing circuitry has passed.

2. The management apparatus as claimed in claim 1, wherein the respective state data includes an action process to be performed when transitioning from the state data corresponding to a prior state, and a transition condition for transitioning to the state data corresponding to a next state, and
    the processing circuitry adds new state data for changing the process to be performed in the given state.

3. The management apparatus as claimed in claim 2, wherein
    the respective state data is stored in the memory as a combination of rewritable data and non-rewritable data, wherein
    the transition condition and the action process of a first state data corresponding to a first state which is the prior state of a second state and the transition condition and the action process of a second state data corresponding to the second state are stored as non-rewritable data, and
    the processing circuitry adds the transition condition for transitioning to a third state data corresponding to a third state as rewritable data included in the first data, when editing the state data to add the third state data as the new state data.

4. The management apparatus as claimed in claim 1, wherein the processing circuitry is further configured to transmit, to a control module of the at least one control module, a request for access to electronic information files stored on the control module.

5. The management apparatus as claimed in claim 4, wherein
    the processing circuitry is further configured to identify a user who has requested the access to the electronic information files.

6. The management apparatus as claimed in claim 5, wherein
    users are divided into groups and are allowed to access the electronic information files on a group basis.

7. The management apparatus of claim 1, wherein the processing circuitry controls the at least one control module, which controls a subsystem of the embedded apparatus.

8. The management apparatus of claim 1, wherein the embedded apparatus is a vehicle and the at least one control module is embedded within the vehicle.

9. The management apparatus of claim 8, wherein each of the at least one control module includes an internal processor and an internal memory.

10. The management apparatus of claim 1, wherein the memory stores the state access control policy, which is set for each of the at least one control module of the embedded apparatus.

11. The management apparatus of claim 1, wherein the memory stores the state access control policy, which defines types of roles performed by access entities that are allowed to access data during respective states of the plurality of lifecycle states.

12. A method for controlling an embedded apparatus within which a management apparatus is embedded, the embedded apparatus including a plurality of control modules separate from the management apparatus, the method comprising:
    managing, by processing circuitry of the management apparatus, a current state of the embedded apparatus to control the control modules based on the current state, wherein the state of the embedded apparatus is changed from one to another among a plurality of lifecycle states over time;
    editing state data stored in a memory so as to change a process to be performed in a given state among the plurality of states, wherein the state data defines processes for controlling the control modules in response to a change of the state, and the state data includes respective state data corresponding to each state in the plurality of states; and
    controlling the control modules according to the state data corresponding to the current state,
    wherein the method further includes controlling access to data of the at least one control module by managing authentication information of an accessing entity who requests to access the data of the at least one control module, and associating the accessing entity with a state access control policy set for each of the plurality of control modules of the embedded apparatus in accordance with the plurality of lifecycle states of the embedded apparatus; and wherein the method further includes authenticating a user as an authorized user who has an access authority for editing certain state data, and denying a request for editing when a certain period from a timing at which the user is successfully authorized has passed.

13. A non-transitory computer-readable recording medium having stored therein a program for causing a computer to serve as a computer of a management apparatus to control an embedded apparatus within which the management apparatus is embedded, the embedded apparatus including a plurality of control modules separate from the management apparatus, the program causing the computer to perform a method comprising:

managing a current state of the embedded apparatus to control the control modules based on the current state, wherein the state of the apparatus is changed from one to another among a plurality of lifecycle states over time, wherein the computer is configured to communicate with the plurality of control modules over a network using a bus protocol, the plurality of control modules being external to the management apparatus;

editing state data stored in a memory so as to change a process to be performed in a given state among a plurality of states, wherein the state data defines processes for controlling the control modules in response to a change of the state, and the state data includes respective state data corresponding to each state in the plurality of states; and controlling the control modules according to the state data corresponding to the current state, wherein the method further includes controlling access to data of the at least one control module by managing authentication information of an accessing entity who requests to access the data of the at least one control module, and associating the accessing entity with a state access control policy set for each of the plurality of control modules of the embedded apparatus in accordance with the plurality of lifecycle states of the embedded apparatus; and wherein the method further includes authenticating a user as an authorized user who has an access authority for editing certain state data, and denying a request for editing when a certain period from a timing at which the user is successfully authorized has passed.

* * * * *